US006781315B2

(12) United States Patent
Nishio et al.

(10) Patent No.: US 6,781,315 B2
(45) Date of Patent: Aug. 24, 2004

(54) COMPACT FLUORESCENT LAMP, SELF-BALLASTED FLUORESCENT LAMP AND LUMINAIRE

(75) Inventors: Kiyoshi Nishio, Yokosuka (JP); Toshiya Tanaka, Yokohama (JP); Takayuki Fujita, Yokosuka (JP); Takeo Yasuda, Yokohama (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 252 days.

(21) Appl. No.: 09/996,314

(22) Filed: Nov. 28, 2001

(65) Prior Publication Data

US 2002/0109462 A1 Aug. 15, 2002

Related U.S. Application Data

(62) Division of application No. 09/242,227, filed on Feb. 11, 1999, which is a division of application No. PCT/JP98/02556, filed on Jun. 11, 1998.

(30) Foreign Application Priority Data

Jun. 11, 1997 (JP) .............................................. 9-154096
Jun. 11, 1997 (JP) .............................................. 9-154097
Dec. 26, 1997 (JP) .............................................. 9-361184
Apr. 30, 1998 (JP) ........................................... 10-121357

(51) Int. Cl.[7] ................................................ H01J 13/46
(52) U.S. Cl. .......................... 315/56; 313/493; 313/634
(58) Field of Search .......................... 315/56, 63, 169.1, 315/317; 362/216; 313/493, 634, 636, 635

(56) References Cited

U.S. PATENT DOCUMENTS 4,298,822 A * 11/1981 Fukuda ........................ 313/493
6,337,539 B1 * 1/2002 Yorifuji et al. ................ 315/56
2002/0057059 A1 * 5/2002 Ogishi et al. ................ 313/636

* cited by examiner

Primary Examiner—James Clingev
Assistant Examiner—Jimmy T. Vu
(74) Attorney, Agent, or Firm—Darby & Darby

(57) ABSTRACT

A compact self-ballasted fluorescent lamp (10) which is equivalent to a typical light bulb is provided The self-ballasted fluorescent lamp (10) includes a cover (14), a lighting circuit (16), an arc tube (18), a base (12) and a globe (17) and formed into a shape whose outline dimensions are nearly identical to the standard dimensions of a typical light bulb. The arc tube (18) is comprised of a plurality of U-shaped bent bulbs (31) which have an inner tube diameter ranging from 6 to 9 mm and arranged in parallel with one another. Having a bulb height ranging from 50 to 60 mm and a discharge path from 200 to 300 mm long, the arc tube (18) is designed such that the total luminous flux is not less than 700 lm with a lamp efficiency of not less than 60 lm/W when the lamp is lit at the lamp power of 7 to 15 W. An envelope (19) comprising the cover (14) and the globe (17) has a height ranging from 110 to 125 mm, including the height of the base (12).

4 Claims, 16 Drawing Sheets

(a)

(b)

COMPACT FLUORESCENT LAMP, SELF-BALLASTED FLUORESCENT LAMP AND LUMINAIRE

This application is a division of pending U.S. application Ser. No. 09/242,227, filed Feb. 11, 1999, now pending, under 35 USC 371 of PCT JP98/02556, filed Jun. 11, 1998.

TECHNICAL FIELD

The present invention relates to a compact fluorescent lamp and a self-ballasted fluorescent lamp which are made to an even smaller scale, and also relates to a luminaire.

BACKGROUND ART

Examples of conventionally known self-ballasted fluorescent lamps include a self-ballasted fluorescent lamp which is provided with a cover, a lighting circuit contained in the cover, and an arc tube bent or otherwise formed into an appropriate shape and contained in a globe, said cover having a base that can be mounted in a socket designed for a typical light bulb.

A self-ballasted fluorescent lamp commercially available at present typically has such specifications as a height of approximately 130 mm (including the height of the base), an outer diameter of approximately 70 mm, an outer tube diameter of the arc tube of approximately 12 mm, a discharge path length of approximately 280 mm, a tube wall thickness of not less than 1.1 mm, and a lamp power of approximately 13 W. Due to its configuration, however, it is difficult to provide a fluorescent lamp which has such an arc tube and is as compact as typical light bulb. Nevertheless, there is an increasing demand for fluorescent lamps made to an even smaller scale.

Another example of self-ballasted fluorescent lamps is disclosed in Japanese Patent Laid-open No. 1987-12051, which relates to a fluorescent lamp, wherein an arc tube having three U-shaped bent bulbs is disposed in such a way that the three U-shaped bent bulbs respectively correspond to the three sides of an approximately equilateral triangle. However, as there is no detailed discussion in the above Japanese Patent Public Disclosure as to various criteria regarding the reduction of the dimensions of the lamp, such as dimensions and the shape of the arc tube as well as criteria for lighting the lamp, the invention disclosed in said publication does not provide the optimum configuration for reducing the dimensions of the lamp.

Another example of fluorescent lamps is disclosed in Japanese Patent Laid-open No. 1987-12051, wherein the arc tube of the fluorescent lamp is formed in a U-like shape having corners bent at approximately 90°. However, the configuration having such an arc tube, i.e. an arc tube having sharp corners, presents a problem of irregularity in luminance, because the corners of the arc tube are too close to the globe when the arc tube is contained in the globe which is as small as that of a typical light bulb.

Another example of fluorescent lamps is disclosed in Japanese Patent Laid-open No. 1997-69309, wherein the arc tube is bent into a spiral or other shape so as to produce a lamp having a shape and dimensions nearly identical to those of a typical light bulb. However, a configuration which calls for bending the arc tube into such a complicated shape as a spiral requires a complicated production process and presents a problem in that reduction of production costs is difficult. As it is difficult to put such an arc tube in practical use for reasons described above, an arc tube having U-shaped bent bulbs is normally used. However, a lamp having such an arc tube, too, is difficult to be made compact, because it imposes various limitations in the shape and the dimensions of the U-shaped bent bulbs.

When the dimensions of a fluorescent lamp are reduced, there arises the danger of heat from the arc tube exerting an unfavorable influence on the lighting circuit that is contained in the cover. As a fluorescent lamp disclosed in Japanese Patent Laid-open No. 1996-273615, one of the known ways to solve this problem is a configuration which calls for disposing a circuit board for mounting components of the lighting circuit thereon in such a manner that the components are positioned apart from the ends of the arc tube at which the electrodes are provided. As a result of the reduction of the dimensions of fluorescent lamps, however, circuit boards, too, are made compact. Therefore, the above configuration presents a problem in that the reduction in the space in which the necessary components are mounted increases the planar dimensions of the lamp too much, particularly at the part where the cover is located.

Regarding a self-ballasted fluorescent lamp which is provided with a cover having a base that can be mounted in a socket designed for an incandescent lamp, a lighting circuit contained in the cover, and an arc tube bent or otherwise formed into an appropriate shape and contained in a globe, a configuration which calls for disposing a circuit board at the base-facing end of an arc tube that is bent in a U-like shape and arranging electrical components on both end of the circuit board is widely known. One of examples of such configuration is disclosed in Japanese Patent Laid-open No. 1988-245803. Compared with the aforementioned configuration which calls for positioning the circuit board apart from the ends of the arc tube, said configuration disclosed in Japanese Patent Laid-open No. 1988-245803 is more effective in reducing the horizontal dimensions of the lamp at the region of the cover. On the other hand, it presents such problems that interference between the electrical components and the arc tube, especially between the electrical components and the end of the arc tube, increase the influence of heat exerted on the electrical components and that such a configuration makes the lamp too long.

As described above, the outer diameter of the conventional self-ballasted fluorescent lamp has larger than the outer diameter of typical light bulb. Therefore, this configuration presents problem in that it is not suitable for a luminaire which uses a typical light bulb in place of a typical light bulb.

Regarding a fluorescent lamp which is used to a self-ballasted fluorescent lamp, a configuration which a bulb has a bent discharge path, which formed by connecting a three U-shaped tubular bodies in series and electrodes disposed at the both ends of the bulb is widely known. One of examples of such configuration is disclosed in Japanese Patent Laid-open No. 220360-1989. And such configuration ensures the length of a discharge path and the reduction of the dimensions of a fluorescent lamp.

In some cases, such a fluorescent lamp uses a main amalgam for controlling the pressure of the mercury vapor in the bulb within an appropriate range during the time that the lamp is lit under normal conditions and an auxiliary amalgam for absorbing mercury floating in the bulb when the lamp is turned off and releasing the absorbed mercury during the early stage of lighting, including the moment when the lighting is initiated. In a configuration where the amalgams are used, the main amalgam is contained in a minute tube which serves to discharge the air and projects from an end, i.e. the end at which an electrode is contained in the bulb, of a tubular body that is located at an end of the bulb, while the auxiliary amalgam is disposed at an end of a tubular body positioned at the middle portion of the bulb. However, when the exhaust minute tube that contains the main amalgam and projects from a tubular body situated at an end of the bulb is located at the same end at which an electrode enclosed in the bulb is located, the temperature of the main amalgam becomes too high due to the influence of the heat from the electrode. Such an increase in the temperature of the main amalgam impairs the effective control of the pressure of the mercury vapor and causes the pressure of the mercury vapor to increase too much, resulting in a decrease in luminous flux. This configuration presents another problem in that it is difficult to uniform or stabilize the pressure of the mercury vapor in the tubular body that is located at the other end of the bulb, at a long distance from the main amalgam.

Another example of fluorescent lamps characterized by inclusion of a main amalgam is disclosed in Japanese Utility Model Publication No. 1992-47893, wherein a main amalgam is disposed in a minute tube projecting from an end of one of the three tubular bodies that form the bulb, said tubular body being the middle tubular body of the three tubular bodies. The fluorescent lamp having this configuration is capable of reducing the influence of the heat from the electrodes exerted on the main amalgam, limiting the pressure of the mercury vapor within an appropriate range by preventing an excessive increase in temperature of the main amalgam, and also capable of reducing the distances from the main amalgam to the respective ends of the bulb by a nearly identical degree, thereby making the pressure of the mercury vapor uniform and stable throughout the interior of the bulb. On the other hand, the above configuration presents a problem in that disposing the main amalgam in the minute tube projecting from an end of the middle tubular body of the three tubular bodies of the bulb positions the main amalgam too far from the electrodes, making it difficult to warm the main amalgam. Especially at the initiation of lighting, when both the ambient temperature around the fluorescent lamp and the temperature of the main amalgam itself are low, the main amalgam is slow to release mercury, because it takes a long time for the temperature of the main amalgam to reach the level where the main amalgam functions most effectively. As a result, the luminous flux build-up characteristics become poor, and it takes an excessively long time to stabilize the luminous flux.

In response to the recent tendency toward compact fluorescent lamps, the demands for reduction of the dimensions of bulbs are on the increase. In the configuration where each minute tube for discharging the air is provided at an end of the bulb, the reduction of the diameter of the bulb makes it necessary to reduce the diameter of the minute tubes. However, a minute tube having a diameter smaller than a given dimension has poor exhaust conductance, resulting in decrease in the exhaust efficiency. On the other hand, if the diameter of the minute tubes are not reduced, the distance between each minute tube and a pair of inner copper-weld wires that support an electrode is reduced, making the operation of sealing the bulb difficult.

In order to solve the above problems, an object of the present invention is to provide a fluorescent lamp and a self-ballasted fluorescent lamp that are characterized by the minutes tubes positioned so as to permit the amalgams to be disposed at the optimum locations and enable the reduction of the diameter of the bulb. Another object of the present invention is to provide a self-ballasted fluorescent lamp and a luminaire that enable the reduction of the diameter of the portion near the base of the lamp as well as the reduction of the length of the lamp. Yet another object of the present invention is to provide a compact self-ballasted fluorescent lamp which is equivalent to a typical light bulb and a luminaire including such a self-ballasted fluorescent lamp.

DISCLOSURE OF THE INVENTION

A fluorescent lamp according to the present invention includes a bulb having a bent discharge path, which is formed by connecting a plurality of tubular bodies in series, and a plurality of minute tubes located at the middle of the discharge path and communicating therewith; a phosphor applied to the inner surface of the bulb; filler gas hermetically contained in the bulb; electrodes respectively disposed at the two ends of the bulb in such a manner as to be enclosed in the sealed bulb; and an amalgam enclosed in a minute tube closest to either electrode. By enclosing the amalgam in a minute tube which is, of the plurality of minute tubes provided at the middle portion of the bulb, located closest to either electrode, the configuration described above prevents the influence of the heat from the electrode from increasing the temperature of the amalgam too much and also permits the amalgam to be warmed easily during the initial stage of lighting. As a result, the configuration is capable of maintaining the pressure of the mercury vapor within an appropriate range and reducing the time taken for the luminous flux to become stable when lighting is initiated.

According to another feature of the invention, the fluorescent lamp has the same configuration as described above except that one of the electrodes attached to the two ends of the bulb so as to be contained in the sealed bulb is a preheating-side electrode, i.e. an electrode disposed at the end where preheating is conducted, while the other electrode is a non-preheating-side electrode, i.e. an electrode disposed at the end where preheating is not conducted; and that the amalgam is enclosed in the minute tube which is closest to the preheating-side electrode. As a result, this configuration permits the amalgam to be warmed easily during the initial stage of lighting and also improves the build-up characteristics of luminous flux.

In the configuration of a fluorescent lamp described above, by forming the open end portion through which said minute tube communicates with the corresponding tubular body narrower than the interior of the body of the minute tube, in which an amalgam will be enclosed, reliable enclosure of the amalgam is ensured.

According to yet another feature of the invention, a fluorescent lamp includes a bulb having an inner tube diameter ranging from 6 to 9 mm and a bent discharge path, which is formed by connecting a plurality of tubular bodies in series, each tubular body that is located at an end of the bulb being provided with a minute tube formed at the non-electrode end of the tubular body, i.e. the end where an electrode is not disposed; a phosphor applied to the inner surface of the bulb; filler gas hermetically contained in the bulb; and electrodes respectively disposed at the two ends of the bulb in such a manner as to be enclosed in the sealed bulb. By forming minute tubes for discharging the air at the non-electrode ends of the respective tubular bodies located at the two ends of the bulb, the configuration described above enables a slender bulb with an inner tube diameter ranging from 6 to 9 mm to have a minute tube having a diameter not smaller than a given dimension as well as superior exhaust conductance and exhaust efficiency at the non-electrode ends of the respective tubular bodies located at the two ends of the bulb. At the same time, the above configuration facilitates an operation to dispose electrodes at the electrode-ends of the tubular bodies and seal the bulb.

In the configuration of a fluorescent lamp that has the same configuration as the one described above, by enclosing an amalgam in the minute tube that is provided at the non-electrode end of a tubular body located at an end of the bulb, it is possible to prevent the influence of the heat from the electrode from increasing the temperature of the amalgam too much and also permit the amalgam to be warmed easily during the initial stage of lighting. As a result, it is possible to maintain the pressure of the mercury vapor within an appropriate range and reduce the time taken for the luminous flux to become stable when lighting is initiated.

In the configuration of a fluorescent lamp that has the same configuration as the one described above, by disposing an auxiliary amalgam in the bulb, it is possible to maintain the pressure of the mercury vapor within an appropriate range and reduce the time taken for the luminous flux to become stable when lighting is initiated.

In the configuration of a fluorescent lamp that has the same configuration as the one described above, by positioning the tubular bodies of the bulb in such a manner that the tubular bodies respectively correspond to the three sides of a triangle when viewed in a cross section, the bulb can be made into such a compact shape as to be usable as a compact self-ballasted fluorescent lamp or the like.

A self-ballasted fluorescent lamp according to the present invention includes a fluorescent lamp and a lighting device for lighting the fluorescent lamp, said fluorescent lamp having a configuration corresponding to any one of the configurations described above. This feature of the invention is capable of providing a self-ballasted fluorescent lamp which has the same effect as one of the fluorescent lamps described above.

A self-ballasted fluorescent lamp according to the present invention includes an arc tube which is formed by parallely arranging a plurality of U-shaped bent bulbs having an inner tube diameter ranging from 6 to 9 mm in such a manner that the height of the bulb and the length of the discharge path respectively range from 50 to 60 mm and from 200 to 300 mm and that the lamp has a total luminous flux of not less than 700 lm and a lamp efficiency of not less than 60 lm/W when the lamp is lit at the lamp power of 7 to 15 W; an envelope having a cover that includes a base and is adapted to permit said arc tube to be attached thereto, the height of the envelope ranging from 110 to 125 mm including the height of the base; and a lighting circuit contained in the cover. As this configuration includes said arc tube, which is formed by parallely arranging a plurality of U-shaped bent bulbs having an inner tube diameter ranging from 6 to 9 mm in such a manner that the height of the bulb and the length of the discharge path respectively range from 50 to 60 mm and from 200 to 300 mm and that the lamp has a total luminous flux of not less than 700 lm and a lamp efficiency of not less than 60 lm/W when the lamp is lit at the lamp power of 7 to 15 W, and limits the height the envelope, which is provided with a cover including a base to which the arc tube is attached, in the range from 110 to 125 mm, it is possible to determine the optimum criteria for the components to make the dimensions and the total luminous flux of the lamp correspond to those of a typical light bulb for general illumination, such as an incandescent lamp having a rated power of 60 W type. The lower limit of the inner tube diameter of the tube is set at 6 mm as mentioned above, because the tube having an inner tube diameter of less than 6 mm requires a considerably high starting voltage and is therefore impractical. The term 'a total luminous flux' mentioned above refers to a value representing radiation from an entire self-ballasted fluorescent lamp. Therefore, if the self-ballasted fluorescent lamp includes a globe, it represents the result of a measurement conducted in the state where the globe is attached. Furthermore, 'a lamp efficiency' is defined as a value based on the lamp power minus the power consumption of the lighting circuit.

According to yet another feature of the invention, a self-ballasted fluorescent lamp includes an arc tube formed by parallely arranging a plurality of U-shaped bent bulbs, each of which has an outer tube diameter ranging from 8 to 11 mm, a tube wall thickness ranging from 0.7 to 1.0 mm and a smoothly curved crown; a cover including a base that is adapted to permit said arc tube to be attached thereto; and a lighting circuit contained in the cover. As this configuration includes said arc tube formed by parallely arranging a plurality of U-shaped bent bulbs, each of which has an outer tube diameter ranging from 8 to 11 mm, a tube wall thickness ranging from 0.7 to 1.0 mm and a smoothly curved crown, it is possible to determine such a tube diameter as to make the dimensions and the total luminous flux of the lamp correspond to those of a typical light bulb for general illumination, such as an incandescent lamp having a rated power of 60 W type and also determine such a range of the thickness of the bulb wall as to enable the increase of the inner surface area of the bulb while ensuring sufficient strength within the limit of the outer diameter of the bulb determined as above. Further, in order to form each U-shaped bent bulb within the limit of the tube wall thickness determined as above, the crown of the U has to be smoothly curved. Should the crown have a sharp corner or corners, the tube wall at the corner(s) would be too thin to maintain sufficient strength.

According to yet another feature of the invention, a self-ballasted fluorescent lamp includes an arc tube formed by parallely arranging a plurality of U-shaped bent bulbs, each of which has a bent portion and straight portions; a cover including a base that is adapted to permit said arc tube to be attached thereto; and a lighting circuit which includes a circuit board having the maximum width ranging up to 1.2 times the maximum width of the arc tube, the maximum width of the arc tube being the dimension along which the U-shaped bent bulbs are arranged, said lighting circuit contained in the cover in such a manner that the circuit board is positioned with one of its sides facing all the ends of the straight portions of the arc tube and provided with components having relatively high heat resistance mounted on the side of the circuit board facing the arc tube and components having relatively low heat resistance mounted on the opposite side of the circuit board. According to the configuration as above, the maximum width of the circuit board is so set as to range up to 1.2 times the maximum dimension along which the U-shaped bent bulbs of the arc tube are arranged, and the components that have relatively high heat resistance are mounted on the arc tube facing side of the circuit board, while the components having relatively low heat resistance are mounted on the other side of the circuit board. Thus, the above configuration is capable of reducing the size of the circuit board while limiting the influence that heat exerts on the components mounted on the circuit board. Consequently, the configuration is capable of reducing the dimensions of the cover, which contains the circuit board, so that they are equivalent to the dimensions of a typical light bulb. Although it is recommended that the circuit board have a shape of a circular disk, which is the most effective shape to ensure the space for mounting, the circuit board may have a polygonal shape, such as a square, or an oval shape.

According to yet another feature of the invention, the components having relatively high heat resistance of the fluorescent lamp described above are chip-shaped rectifying devices. Therefore, the thermal influence from the arc tube can be limited.

According to yet another feature of the invention, a self-ballasted fluorescent lamp includes a cover having a base; a lighting circuit contained in the cover; a globe having a nearly identical shape as a typical light bulb and attached to the cover; and an arc tube which is contained in the globe and has three or more U-shaped bent bulbs, each of which has a smoothly curbed crown, the U-shaped bent bulbs connected to one another in series and arranged so that their crowns are aligned in a circle and face the inner surface of the globe and that the U-shaped bent bulbs are spaced apart at a distance not exceeding the outer diameter of each bulb. As the arc tube has three or more U-shaped bent bulbs which have smoothly curbed crowns, are connected to one another in series, and positioned apart from one another in such a manner that the distance between the bulbs does not exceed the outer diameter of each bulb and that their crowns are aligned in a circle and face the inner surface of the globe, this configuration makes it possible to dispose the arc tube in the globe that is formed in a compact shape resembling a typical light bulb. This configuration is also capable of providing more uniform luminosity and more effective illumination even if the arc tube is contained in such a compact globe.

According to yet another feature of the invention, a self-ballasted fluorescent lamp includes an arc tube formed by parallely arranging a plurality of U-shaped bent bulbs having an outer tube diameter ranging from 8 to 11 mm, the maximum width of the arc tube along which the U-shaped bent bulbs are arranged ranging from 32 to 43 mm; a cover including a base that is adapted to permit said arc tube to be attached thereto; a lighting circuit contained in the cover; and a globe having a maximum outer diameter limited in the range from 55 to 60 mm and attached to the cover with said arc tube enclosed in the globe in such a manner that $A2>A1 \geq A3$, wherein $A1$ represents the minimum distance between the globe and each crown of the arc tube, $A2$ the minimum distance between the maximum diameter portion of the globe and the arc tube, and $A3$ the minimum distance between the base end of the globe and the arc tube. As a self-ballasted fluorescent lamp includes an arc tube formed by parallely arranging a plurality of U-shaped bent bulbs having an outer tube diameter ranging from 8 to 11 mm, the maximum width of the arc tube along which the U-shaped bent bulbs are arranged ranging from 32 to 43 mm, and a globe having a maximum outer diameter limited in the range from 55 to 60 mm and attached to the cover with the arc tube enclosed in the globe in such a manner that $A2>A1 \geq A3$, wherein $A1$ represents the minimum distance between the globe and each crown of the arc tube, $A2$ the minimum distance between the maximum diameter portion of the globe and the arc tube, and $A3$ the minimum distance between the base end of the globe and the arc tube, the feature of the invention described above enables the determination of the optimum criteria for luminous intensity distribution in the direction of the sides and the crown of the arc tube.

The above configuration increases the luminous intensity distributed in the direction of the base and is therefore particularly effective in bringing the characteristics of luminous intensity distribution of the lamp into close proximity to those of an incandescent lamp. As a result, the lamp can be illuminated as if it were an incandescent lamp and used for a luminaire that is designed for an incandescent lamp without giving any disagreeability.

As the outer diameter of the globe or the diameter of the portion of the cover where the base is located has to be limited to no larger than 45 mm in order to make the lamp resemble a typical light bulb and more suitable to be fitted in a luminaire that uses a typical light bulb, the upper limit of the maximum width of the arc tube along which the U-shaped bent bulbs are arranged is set at 43 mm, taking the clearance between the inner surface of the globe or the cover and the outer circumferential surface of the arc tube into consideration. In cases where a self-ballasted fluorescent lamp is installed in a luminaire designed for a typical light bulb, limiting the outer diameter of the globe or the diameter of the portion of the cover where the base is located to no larger than 45 mm presents such other benefits as ensuring a wide clearance between the lamp and the other components of the luminaire, thereby enabling the radiation under good conditions.

By setting $A1$ in the range from 2 to 8 mm, $A2$ in the range from 3 to 13 mm and $A3$ in the range from 2 to 8 mm in the configuration of the self-ballasted fluorescent lamp described above, the optimum criteria for distributing light toward the sides and the crown of the arc tube can be determined.

By forming the self-ballasted fluorescent lamp described above so as to have an outer shape resembling a typical light bulb for general illumination, the invention permits the lamp to be mounted in a luminaire designed for a typical light bulb, thereby expanding the range of usage. As the self-ballasted fluorescent lamp having an outer shape resembling a typical light bulb can be mounted in such a luminaire without giving any disagreeability, the invention is also capable of improving the appearance of the self-ballasted fluorescent lamp. The term 'light bulb for general illumination' mentioned above means a light bulb defined as JIS Standard C 7501. In cases where a self-ballasted fluorescent lamp is provided with a globe, it is desirable that the shape of the outline of the globe be similar to the glass light bulb of a typical light bulb.

As yet another feature of the invention, bonding the arc tube, the globe and the supporting member supporting the arc tube of a self-ballasted fluorescent lamp having the configuration as above to one another by means of a bonding agent permits the heat to be efficiently radiated from the arc tube through the globe and also simplifies the structure, thereby enabling the reduction of the production costs.

Furthermore, by arranging the U-shaped bent bulbs of the arc tube of a self-ballasted fluorescent lamp having the configuration as above in such a manner that their cross sections give the appearance of a triangle, the arc tube can be arranged in a compact shape.

By setting the distance $w1$ between the two straight portions of each U-shaped bent bulb of a self-ballasted fluorescent lamp having the configuration as above to be nearly identical to the distance $w2$ between each straight portion of a U-shaped bent bulb and the U-shaped bent bulb that is adjacent to said straight portion, and respectively limiting the distances $w1$, $w2$ in the range from 1 to 5 mm, the arc tube can be arranged in a compact shape. Although the distances $w1$, $w2$ may be set at any desired dimensions on condition of being in the range from 1 to 5 mm, it is desirable for production reasons that they be in the range from 2 to 3 mm. Further, a distance that exceeds 5 mm may make it impossible to produce a compact lamp.

According to yet another feature of the invention, the lighting circuit of a self-ballasted fluorescent lamp having the configuration as above includes a half-bridge type inverter main circuit having at least a pair of transistors consisting of an N-channel transistor and a P-channel transistor, which are connected in series with each other to an input power supply and serve as the main switching element for generating a high frequency voltage; a ballast choke connected to the inverter main circuit so as to light the arc tube in stable conditions; and a control means which has a secondary winding magnetically connected to the ballast choke and shared by the N-channel transistor and the P-channel transistor so that the control means serves to control the transistors by means of the secondary winding. With the configuration as above, wherein the control means operates the N-channel transistor and the P-channel transistor, the invention enables the control of a plurality of transistors under different conditions based on output from a single control means, thereby simplifying the configuration of the circuit. By using a lighting circuit which requires only a minimal number of parts as described above, the dimensions of the self-ballasted fluorescent lamp can be further reduced.

According to yet another feature of the invention, a self-ballasted fluorescent lamp includes an arc tube; a cover having a base; and a lighting circuit that has a circuit board and electrical components mounted on both sides of the circuit board in such a manner that the circuit board is contained in the cover and faces the ends of the arc tube and that the electrical components mounted on the side facing the arc tube are so positioned as to not be aligned with the ends of the arc tube. By so positioning the circuit board as to face the ends of the arc tube and mounting electrical components on both sides of the circuit board, the configuration described above is capable of reducing the dimensions of the circuit board and, consequently, reducing the diameter of the portion of the lamp near the base. Furthermore, by so arranging electrical components mounted on the side facing the arc tube as to not be aligned with the ends of the arc tube, the configuration is capable of preventing interference of the arc tube with the electrical components, limiting the influence of the heat from the arc tube, and reducing the length of the lamp.

According to yet another feature of the invention, a self-ballasted fluorescent lamp includes an arc tube; a cover having a base; and a lighting circuit and a lighting circuit that has a circuit board and electrical components mounted on both sides of the circuit board in such a manner that the circuit board is contained in the cover and faces the ends of the arc tube and that the electrical components mounted on the side facing the arc tube are so positioned as to not be aligned with the minute tubes of the arc tube. By so positioning the circuit board as to face the ends of the arc tube and mounting electrical components on both sides of the circuit board, the configuration described above is capable of reducing the dimensions of the circuit board and, consequently, reducing the diameter of the portion near the base. Furthermore, by so arranging electrical components mounted on the side facing the arc tube as to not be aligned with the minute tubes of the arc tube, the configuration is capable of preventing interference of the minute tubes that project further from the arc tube with the electrical components, limiting the influence of the heat from the arc tube, and reducing the length of the lamp.

By forming a self-ballasted fluorescent lamp having the configuration described above in such a manner that the outer diameter of the circuit board is nearly identical to the inner diameter of the cover, the invention makes it possible to arrange components with the space inside the cover used to the full extent and, consequently, reduce the diameter of the portion near the base.

In the configuration of a self-ballasted fluorescent lamp described above, by positioning the electrical components mounted on the side facing the arc tube apart from the electrodes of the arc tube, the influence that the heat generated by the electrodes exerts on the electrical components can be limited.

A luminaire according to the invention is provided with a self-ballasted fluorescent lamp which has any one of the configurations described above. Using a compact self-ballasted fluorescent lamp according to the invention enables the use of a luminaire designed for a typical light bulb. The invention also enables the reduction of the diameter of the portion of the self-ballasted fluorescent lamp near the base and the length of the lamp, the use of a socket designed for an incandescent lamp without any disagreeability, the reduction of production costs and the improvement of the appearance.

BEST MODE FOR CARRYING OUT THE INVENTION

Figure 1:
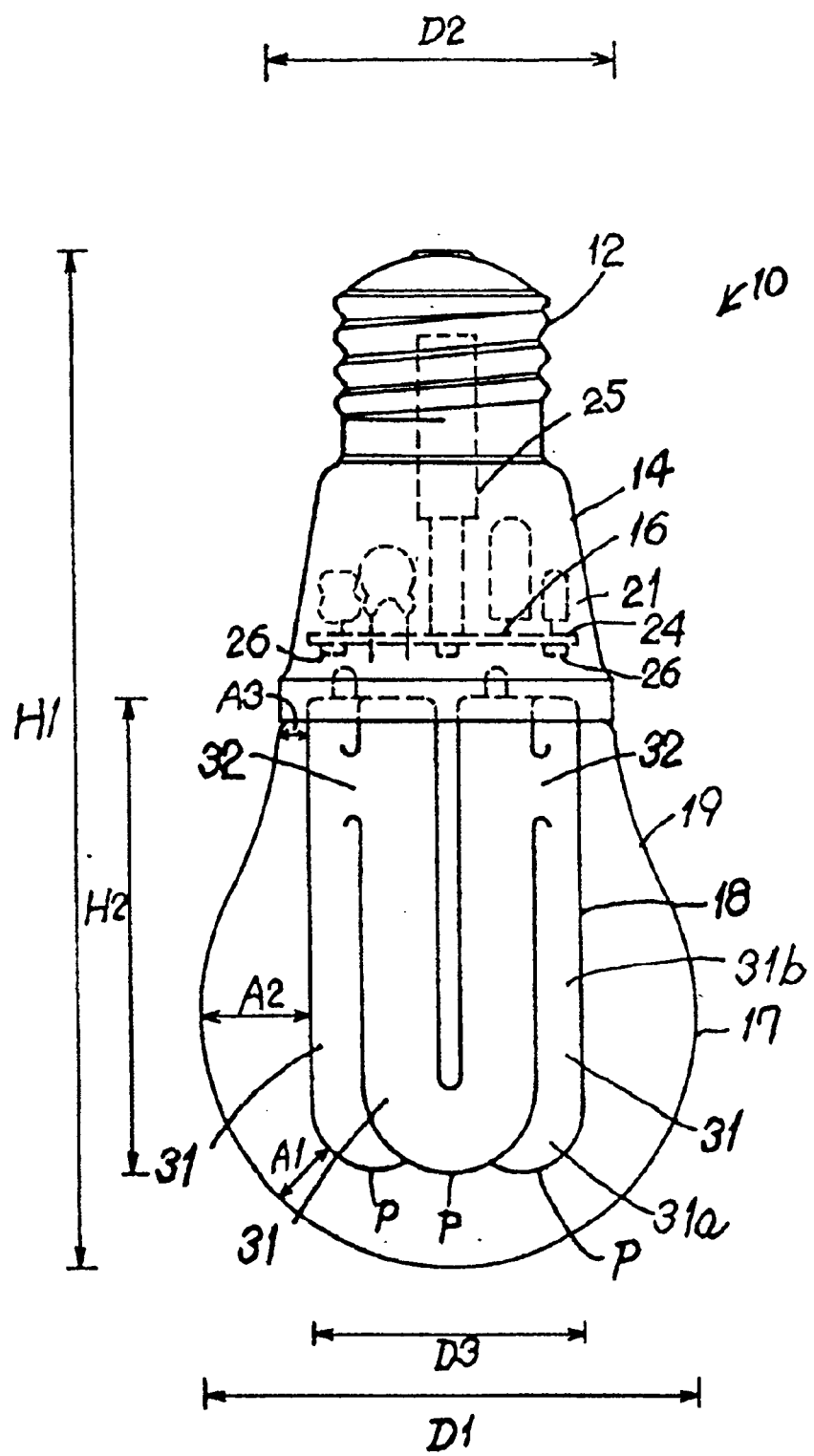
FIG. 1 is a side view of a self-ballasted fluorescent lamp according to a first embodiment of the present invention, wherein the globe of the lamp is illustrated as if the inside contents were visible.

Next, a fluorescent lamp, a self-ballasted fluorescent lamp and a luminaire according to an embodiment of the present invention are explained hereunder, referring to the drawings.

Figure 2:
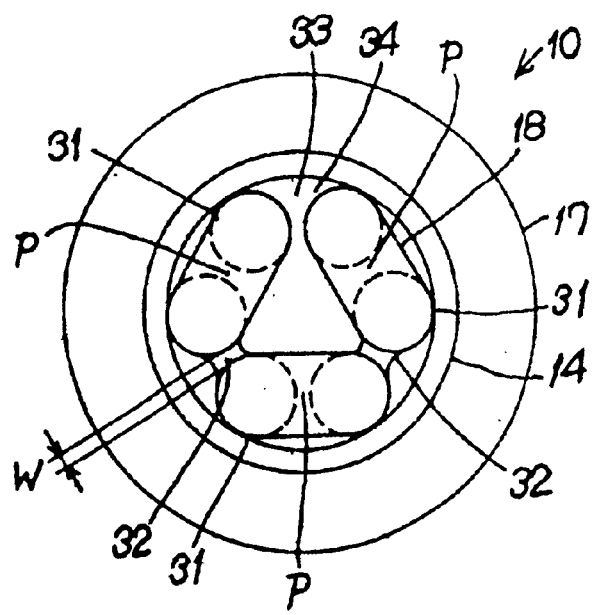
FIG. 2 is a bottom view of same, wherein the globe of the lamp is illustrated as if the inside contents were visible.
Figure 3:
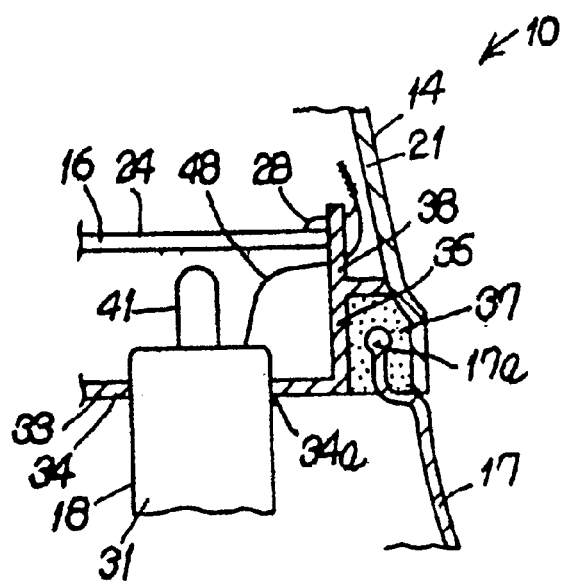
FIG. 3 is a sectional view of a part of said self-ballasted fluorescent lamp.
Figure 4:
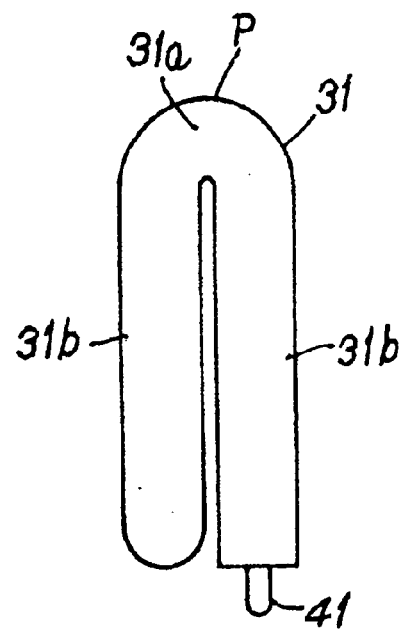
FIG. 4 is a side view of a U-shaped bent bulb of said self-ballasted fluorescent lamp.
Figure 5:
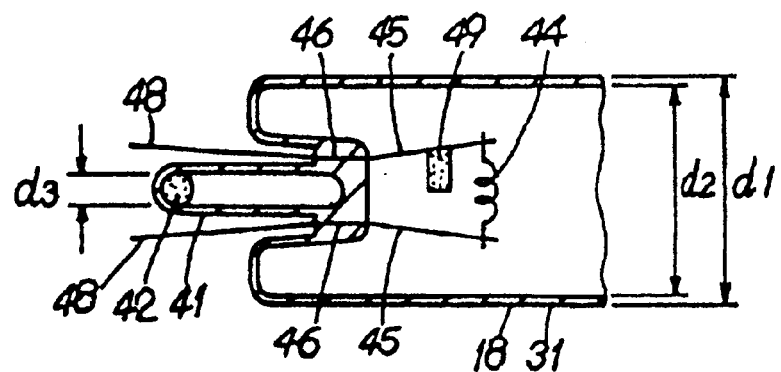
FIG. 5 is a sectional view of a part of said U-shaped bent bulb.

A first embodiment of the present invention is shown in FIGS. 1 through 5, wherein FIG. 1 is a side view of the self-ballasted fluorescent lamp with the globe of the lamp illustrated as if the inside contents were visible; FIG. 2 is a bottom view of same with the globe of the lamp illustrated as if the inside contents were visible; FIG. 3 is a sectional view of a part of the self-ballasted fluorescent lamp; FIG. 4 is a side view of a U-shaped bent bulb; and FIG. 5 is a sectional view of a part of said U-shaped bent bulb.

Referring to FIGS. 1 through 3, numeral 10 denotes a self-ballasted fluorescent lamp, comprising a cover 14 having a base 12, a lighting circuit 16 contained in the cover 14, a translucent globe 17, and an arc tube 18 contained in the globe 17. The globe 17 and the cover 14 form an envelope 19 that has such an outer shape as to have nearly the same dimensions as standard dimensions of an electric light bulb for general illumination, e.g. a 60 W-type incandescent lamp. In other words, the height H1 of the envelope 19 ranges from approximately 110 to 125 mm including the base 12; the diameter D1, i.e. the outer diameter; and the outer diameter D2 of the cover 14 is approximately 40 mm. The term 'electric light bulb for general illumination' mentioned above means a light bulb defined as JIS Standard C 7501. Further, in the explanation hereunder, the side where the base 12 is located is referred to as the upper side, while the side where the globe 17 is located is referred to as the lower side.

The cover 14 is provided with a cover body 21 that may be formed of a heat resistant synthetic resin such as polybutylene terephthalate (PBT). The cover body 21 has an approximately cylindrical shape that flares downward. The base 12, which may be of the E26 type, is disposed over the top of the cover body 21 and fastened thereto with a bonding agent, or by such other means as crimping.

The globe 17 may be transparent or photo-diffusing milky white. The globe 17 is formed of glass, synthetic resin or the like into a smoothly curved shape nearly identical to the glass bulb of a typical light bulb having a rated power consumption of approximately 60 W. The edge of the opening of the globe 17 is formed into a fitting edge 17a to be fitted in an opening at the bottom of the cover 14. The luminance of the lamp may be made more uniform by forming the globe 17 in combination with another member, such as a diffusion film.

As shown in FIGS. 1 and 3, the lighting circuit 16 contained in the cover 14 has a disk-shaped circuit board 24 disposed horizontally, in other words perpendicularly to the lengthwise direction of the arc tube 18. A plurality of electrical components 25, 26 are respectively mounted on both sides of the circuit board 24, i.e. the upside facing the base 12 and the underside facing the arc tube 18, thereby forming an inverter circuit (a high-frequency lighting circuit) for conducting high frequency lighting.

Of the of electrical components 25, 26 mentioned above, the electrical components 25 mainly consisting of components having relatively low heat resistance, such as electrolytic condensers and film condensers, are mounted on the upper face of the circuit board 24, while electrical components 26 consisting of thin, small chip-shaped rectifiers, rectifying devices or diode bridges having relatively high heat resistance, transistors, resistors, etc. that are arranged in a package approximately 2 to 3 mm in thick are mounted on the underside of the circuit board 24.

The circuit board 24 has a shape resembling a disk whose diameter, i.e. the maximum width, ranges up to 1.2 times the maximum dimension along which the U-shaped bent bulbs are arranged. A total of four circuit-side wires 28 adapted to serve as the output unit are arranged in two pairs and drawn out of the circuit board 24. Instead of providing the circuit-side wires 28, wrapping pins may be set in the circuit board 24.

As shown in FIGS. 1 through 5, the arc tube 18 contained in the globe 17 consists of three U-shaped bent bulbs 31 that have nearly identical shapes and arranged at given locations. The three U-shaped bent bulbs 31 are connected to one another via communicating tubes 32 so as to form a single discharge path. Each U-shaped bent bulb 31 is provided with a phosphor film, which is formed on the inner surface of the U-shaped bent bulb 31, and hermetically contained a rare gas, such as argon, and mercury. Each U-shaped bent bulb 31 is a cylindrical bulb made of glass having an outer tube diameter d1 ranging from 8 to 11 mm, an inner tube diameter d2 ranging from 6 to 9 mm, a thickness of the tube wall ranging from 0.7 to 1.0 mm and a length ranging from approximately 110 to 130 mm. Each U-shaped bent bulb 31 is formed into a smoothly curved U-like shape having a crown P by bending said glass bulb at the middle portion so that the bulb 31 has a bent portion 31a that is smoothly turned back on itself and a pair of straight portions 31b extending parallel to each other and integrally connected to the bent portion 31a. The height H2 of the bulbs of the arc tube 18 formed as above ranges from 50 to 60 mm; the length of the discharge path ranges from 200 to 300 mm; and the maximum width along which the bulbs are arranged, i.e. the dimension represented by D3 in FIG. 1, ranges from 32 to 43 mm.

The arc tube 18 is fastened to a partition plate 33, which may be referred to as a supporting member in the claims or other parts of the specification and serves as a fluorescent lamp fastening member as well as a lighting circuit fastening member. The partition plate 33 is fastened to the cover 14. To be more specific, the partition plate 33 has a disk-shaped base portion 34 which is provided with mounting holes 34a. The arc tube 18 is fastened to the partition plate 33 with the ends of the U-shaped bent bulbs 31 respectively inserted into the mounting holes 34a and secured therein by means of, for example, bonding the regions of the bulbs to the base portion with an adhesive agent. A fitting step portion 35 that extends upward and then outward is formed around the outer edge of the base portion 34. These members are fastened to one another by fitting the fitting step portion 35 in the cover 14 and filling the gap between the fitting step portion 35 and the cover 14 with a bonding agent 37 in such a state that the fitting edge 17a of the globe 17 is fitted between the fitting step portion 35 and the cover 14. A mounting edge 38 that may have a cylindrical shape rises from the top of the fitting step portion 35, and the circuit board 24 of the lighting circuit 16 is fitted, bonded or otherwise attached to the mounting edge 38.

Figure 7:
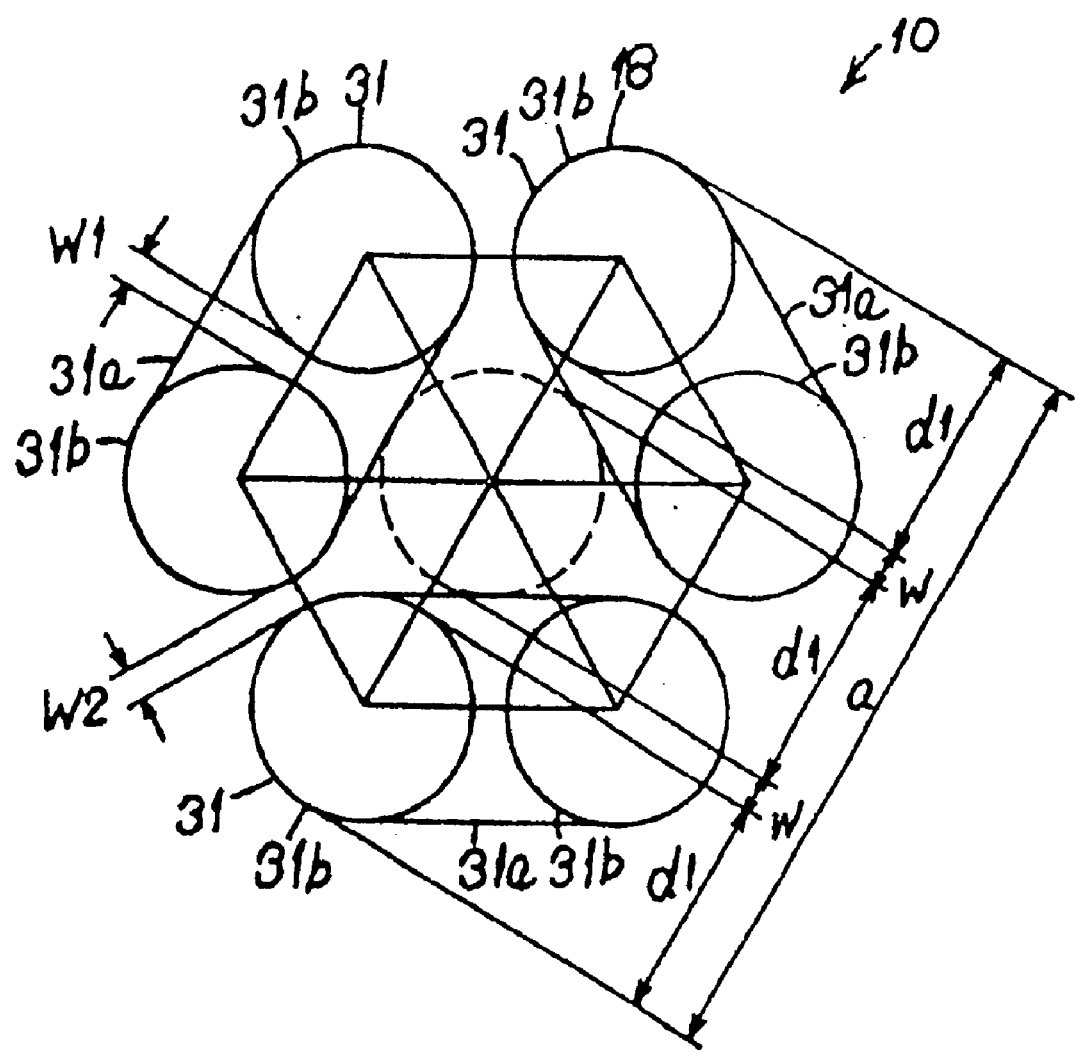
FIG. 7 is a schematic illustration to explain the arrangement of said U-shaped bent bulb.

When the self-ballasted fluorescent lamp 10 is assembled in the manner described above, the arc tube 18 is housed in the globe 17 at a given position. To be more specific, in the state where the self-ballasted fluorescent lamp 10 is assembled, the crowns P of the U-shaped bent bulbs 31 are aligned at regular intervals in a circle whose center is on the central axis of the self-ballasted fluorescent lamp 10 extending in the vertical direction, and the straight portions 31b of the U-shaped bent bulbs 31, too, are aligned at regular intervals in a circle whose center corresponds to the central axis of the lamp. In other words, as shown in FIG. 7, the tube axes of the straight portions 31b of the three U-shaped bent bulbs 31 are respectively located at the approximate vertexes of a regular hexagon. The distance w1 between the two straight portions 31b of each U-shaped bent bulb 31 is nearly identical to the distance w2 between each straight portion 31b and the U-shaped bent bulb 31 adjacent to said straight portion 31b, and the distances w1, w2 are in the range between 1 mm and 5 mm. Although the distances w1, w2 may be set at any desired values on condition of being in the range from 1 to 5 mm, it is desirable for production reasons that they are in the range between 2 mm and 3 mm. Further, a distance that exceeds 5 mm may make it impossible to produce a compact lamp.

Figure 6:
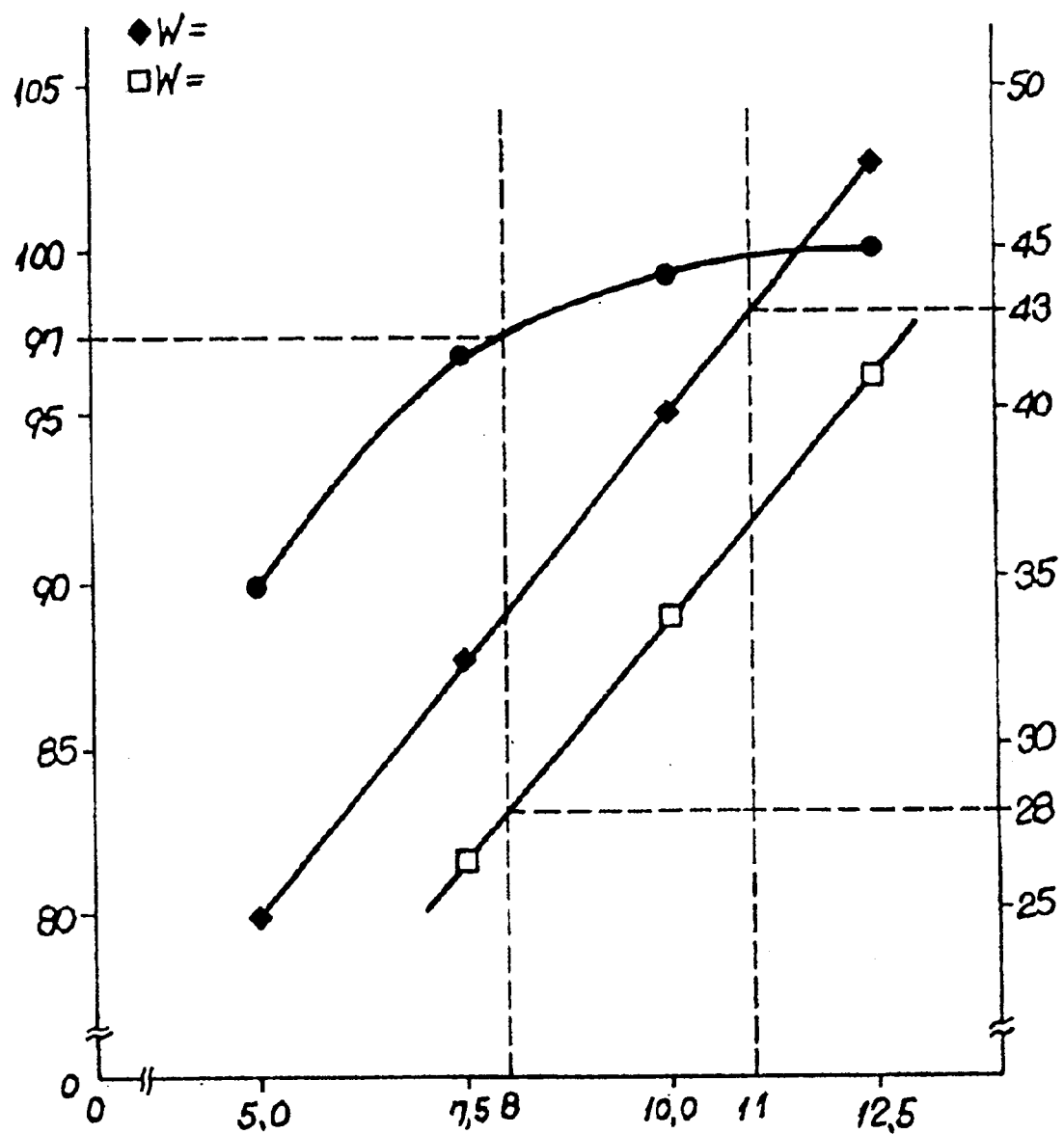
FIG. 6 is a graph showing the relationship among outer tube diameters of said U-shaped bent bulb, lamp efficiencies and maximum widths of the arc tube.

Referring to FIGS. 6 and 7, the reason for setting the maximum width a of the aforementioned arc tube 18 in the range from the 32 to 43 mm and the outer tube diameter d1 of each U-shaped bent bulb 31 in the range from 8 to 11 mm is explained hereunder.

FIG. 6 shows the lamp efficiency in the case where the thickness of the tube wall of the arc tube 18, the gas pressure, the length of the discharge path and the lamp current are respectively set at 0.8 mm, 400 Pa, 250 mm and 0.2 A, and also shows the relationship between the maximum width a and the outer tube diameter d1 of each U-shaped bent bulb 31 regarding the exemplary configurations where the distances w are respectively 5 mm and 2 mm.

In order to make the lamp resemble a typical light bulb and more suitable to be fitted in a luminaire that uses a typical light bulb, the outer diameter of the glove 17 has to be 45 mm or less (around 40 mm being most desirable). In case of the present embodiment, the upper limit of the maximum width a of the arc tube 18 is set at 43 mm, taking the clearance between the inner surface of the globe 17 or the cover 14 and the outer circumferential surface of the arc tube 18 into consideration.

The lower limit of the outer tube diameter d1 is set at 8 mm, where the relative lamp efficiency becomes 97% or more.

The upper limit of the outer tube diameter d1 is determined based on the equation a=3 d1+2 w, wherein the upper limit of the maximum width a of the arc tube 18 is 43 mm. It has to be noted that the tube axes of the straight portions 31b of the three U-shaped bent bulbs 31 of the arc tube 18 are respectively located at the approximate vertexes of a regular hexagon. In other words, w1 and w2 are nearly equal. Therefore, the upper limit of the outer tube diameter d1 is set at 11 mm by replacing the variables in the equation a=3 d1+2 w with the maximum dimensions, in other words by replacing 'a' and 'w' with 43 and 5 respectively, and finding the value of d1 from the equation 43=3 d1+2×5.

The lower limit of the maximum width a of the arc tube 18 is set at 28 mm by replacing the variables in the equation a=3 d1+2 w with the minimum dimensions, in other words by replacing "d1" and "w" with 8 and 2 respectively, and finding the value of a from the equation a The lower limit of the inner tube diameter is set at 6 mm, because the inner tube diameter of less than 6 mm would result in an excessively high starting voltage and therefore be not practical. =3×8+2×2.

Should the thickness of the tube wall be 1.1 mm or more, the glass material tends to accumulate at the inside of the U-shaped curved portions 31a, making such portions prone to cracks. Such an accumulation of glass can be limited by setting the thickness of the tube wall to be in the range between 0.7 mm and 1.0 mm. Given that the minimum clearance between the globe 17 and each crown P of the arc tube 18 is A1; the minimum clearance between the portion where the outer diameter of the globe 17 is the greatest and the arc tube 18 is A2; and that the minimum clearance between the base end of the globe 17 and the arc tube 18 is A3, the relationship among them has to be as shown in the representation: A2>A1≧A3, wherein A1, A2 and A3 are respectively in the ranges from approximately 2 to 8 mm, from approximately 3 to 13 mm and from approximately 2 to 8 mm. By setting the relative dimensions such as A2>A1≧A3, the distribution of luminous intensity can be made such that the light distributed to the crowns is more intense. Furthermore, by setting A1 such as A2>A1≧A3, i.e. 2 mm>A1≧8 mm, the light distributed to the crowns can be further. intensified, in other words the optimum criteria for luminous intensity distribution to the side wall and the crown of the arc tube 18 can be obtained. Using a luminance meter (BM-8 manufactured by TOPCON CORP.), the surface luminance of the globe 17 was measured to be 380 cd/m². Results of the experiment also indicated that the total light flux amounted to be 810 lm.

One of the two ends of each U-shaped bent bulb 31 is sealed by means of a line seal with a mount, a pinch seal without a mount, or the like. A minute tube 41 that may otherwise be called an exhaust tube is welded to the other end of each U-shaped bent bulb 31 to discharge the air. The minute tube 41 is designed such that it may be provided with an amalgam 42 if it is necessary. A filament coil 44 is disposed at the end of each U-shaped bent bulb 31 that is located at an end of the arc tube 18 in such a state that each filament coil 44 is supported between a pair of copper-weld wires (lead-in wires) 45 by use of a line seal with a mount or the like. Via each respective dumet wire 46 attached to the glass at the end of the U-shaped bent bulb 31 and thus sealed in the bulb, each copper-weld wire 45 is connected to a lamp wire 48 that is drawn out of the U-shaped bent bulb 31. If it is necessary, one of the copper-weld wires 45 may be provided with an auxiliary amalgam 49.

As shown in FIG. 3, the four lamp wires 48 that are arranged in two pairs and drawn out of the arc tube 18 are electrically and mechanically connected to the lighting circuit 16 as they are twisted with circuit wires 28 that are drawn from the lighting circuit 16. Each set of wires 28, 48 are inserted into a groove formed in the rib-like mounting edge 38 of the partition plate 33, and thus guided by the groove. Compared with a structure that calls for providing the lighting circuit 16 with a connector and inserting the lamp wires 48 into the connector to electrically connect the wires to the lighting circuit 16, or another structure that calls for electrically connecting the lamp wires 48 by wrapping the wires around column-shaped pins that are projected from the lighting circuit 16, the configuration according to the embodiment described above requires only a limited space and therefore is capable of reducing the dimensions of the lamp. Furthermore, as there is no need of parts dedicated for the connection, the embodiment also ensures easy, reliable connection of wires at a low cost. Should there be a great difference between the diameters of each circuit wire 28 and lamp wire 48, such a difference makes a twisting operation difficult. Therefore, it is desirable to set the relative dimensions of the wires, i.e. the diameter D28 of each circuit wire 28 and the diameter D48 of each lamp wire 48, to be (0.9×D28)<D48<(1.1×D28) to ensure easy and reliable connection. The electrical and mechanical connection of the wires can be made even more reliable by twisting the wires no fewer than three turns. In an alternative configuration wherein members in the shape of a cylindrical pin are projected upward from the partition plate 33, each pair of wires 28, 48 may be connected by twisting around one of these cylindrical members.

In cases where the inner tube diameter d3 of the minute tube 41 of each U-shaped bent bulb for discharging gas from the U-shaped bent bulb is too small with respect to the inner tube diameter d2 of the U-shaped bent bulb 31, it is necessary to increase the duration of gas discharge due to the poor exhaust efficiency. In cases where the minute tube 41 has an excessively large diameter, it is impossible to provide a sufficient clearance between the outer surface of the minute tube 41 or the inner surface of the U-shaped bent bulb 31 and each copper-weld wire 45, which is attached to and sealed in the bulb at the same time when the minute tube 41 is attached. Such a lack of a sufficient clearance tends to cause an improper attachment or other problems, often degrading the quality of the arc tube 18. A U-shaped bent bulb of a conventional lamp, in particular, has an inner tube diameter more than three times as large as the inner tube diameter of its minute tube 41, making it difficult to improve the air discharge efficiency, because the minute tube 41 for discharging the air is disposed at one of the lengthwise ends of the arc tube in many cases. In order to solve this problem, the present embodiment calls for setting the inner tube diameter d3 of each minute tube 41, with respect to the inner tube diameter d2 of the U-shaped bent bulb 31, to be within the range 2.0<(d2/d3)<2.8. Thus increasing the inner tube diameter d3 of the minute tubes 41 improves the quality of the arc tube 18 by increasing the air discharge efficiency as well as ensuring the reliable sealing and attachment of the minute tubes 41. Furthermore, the minute tubes 41 serving as exhaust pipes may be disposed about the middle of the length of the arc tube 18 to increase the air discharge efficiency.

The self-ballasted fluorescent lamp 10 structured as above has such characteristics that, when a rated input power is 14 W, a high frequency power of 12.5 W is applied to the arc tube 18, producing a lamp current of 280 mA, a lamp voltage of 65 V and a total luminous flux of 810 lm, which results from the use of the three band phosphor.

Figure 8:
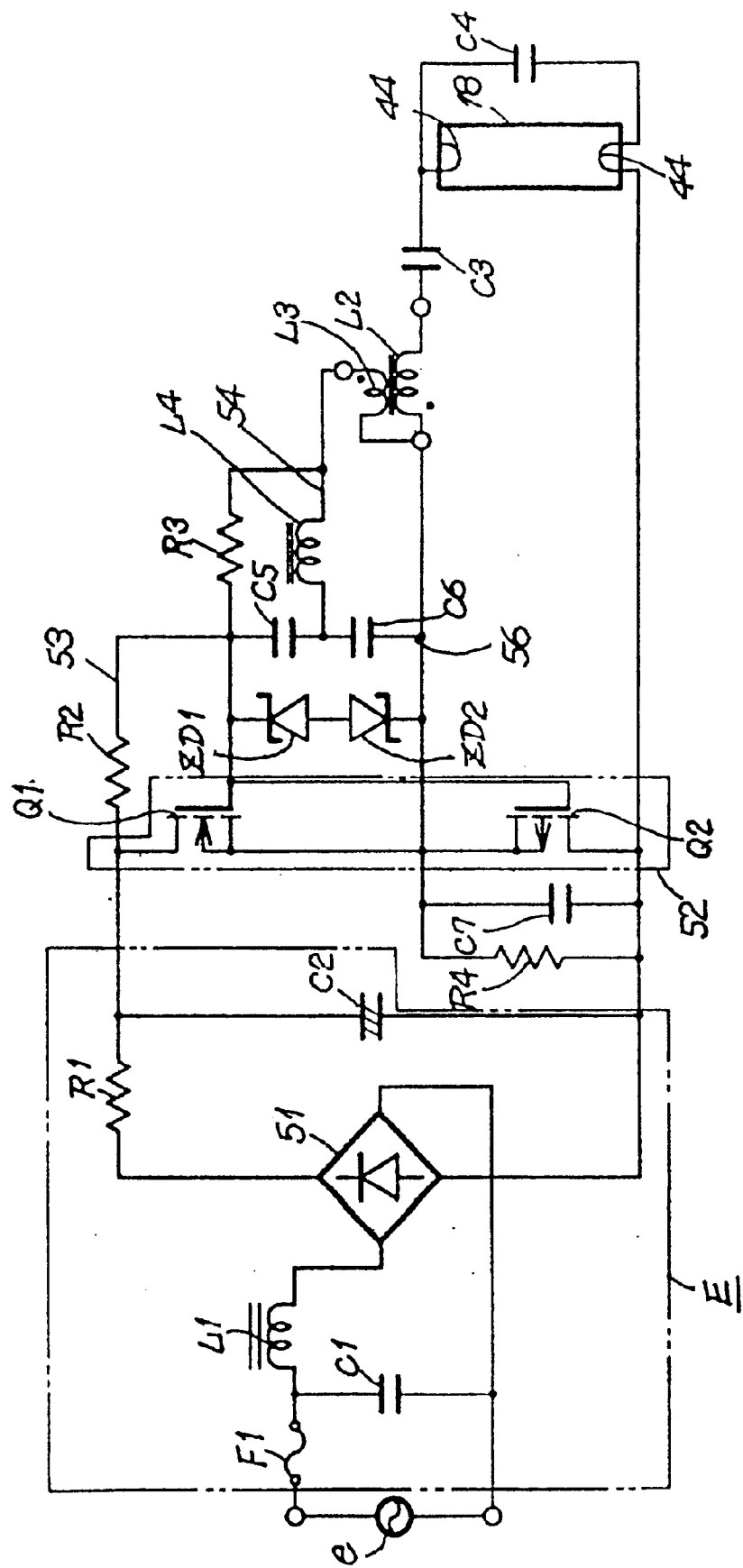
FIG. 8 is a circuit diagram of a lighting circuit of said lamp.

FIG. 8 is a circuit diagram illustrating the configuration of the lighting circuit 16. The lighting circuit 16 has an input power unit E. The input power unit E includes a condenser C1 which constitutes a filter and is connected to a commercial AC power supply e via a fuse F1, and a full-wave rectifying circuit 51 whose input terminal is connected to the condenser Cl via an inductor L1 that constitutes a filter. A smoothing condenser C2 is connected to the output terminal of the full-wave rectifying circuit 51 via a resistor R1, and an inverter main circuit 52 of a half-bridge type is connected to the condenser C2.

The inverter main circuit 52 comprises a series circuit of field effect transistors Q1, Q2 serving as a switching element is connected in parallel with the condenser C2. The field effect transistor Q1 is an N-channel transistor of the MOS type, while the field effect transistor Q2 is a P-channel transistor of the MOS type. The source of the N-channel field effect transistor Q1 and the source of the P-channel field effect transistor Q2 are connected to each other.

An end of each one of the filament coils 44, 44, which are respectively disposed at the two ends of the arc tube 18, is connected to a point between the drain and the source of the field effect transistor Q2 via a ballast choke L2 and a condenser C3 for interrupting direct current. In case of the present embodiment, the ballast choke L2 also serves to generate resonance. A start-up condenser C4 is disposed between and connected to the aforementioned one end of the one of the filament coils 44, 44 and the other end of the other filament coil 44. An activating resistor R2 which forms a part of an activating circuit 53 is connected to the gate of the field effect transistor Q1, the gate of the field effect transistor Q2, and the junction point where the resistor R1 and the condenser C2 are connected. A series circuit of a condenser C5 and a condenser C6 is disposed between and connected to the gates of the field effect transistors Q1, Q2 and the sources of the field effect transistors Q1, Q2. A series circuit which consists of a Zener diode ZD1 and a Zener diode ZD2 and serves to protect the gates of the field effect transistors Q1, Q2 is connected in parallel with a series circuit consisting of the condenser C5 and the condenser C6. The condenser C6 forms a part of a control circuit 54 that serves as a control means. The ballast choke L2 is provided with a secondary winding L3, which is magnetically joined to the ballast choke L2 and connected to a resonance circuit 56 that consists of an inductor L4 and the condenser C6. Furthermore, a resistor R3 of the activating circuit 53 is connected in parallel to a series circuit consisting of the condenser C5 and the inductor L4.

A parallel circuit consisting of a resistor R4 of the activating circuit 53 and a condenser C7 is disposed between and connected to the drain and the source of the field effect transistor Q2. Said condenser C7 serves to improve the switching function.

The field effect transistors Q1, Q2 may be of a bipolar type. The inverter main circuit 52 may have two or more pairs of serially connected switching elements. One of the examples of such a configuration is a full-bridge type. Furthermore, it does not matter whether the arc tube 18 is of a type which calls for preheating both filament coils 44 or a type wherein neither filament coil 44 is preheated.

With the configuration as above, when the power is fed into the lighting circuit 16, the voltage on the commercial AC power supply e is rectified over the full wave by the full-wave rectifying circuit 51 and smoothed by the condenser C2.

The voltage is applied through the resistor R2 to the gate of the N-channel field effect transistor Q1, thereby turning on the field effect transistor Q1. As a result, a voltage is applied to the circuit consisting of the ballast choke L2, the condenser C3 and the condenser C4 so that the bast choke L12 and the condenser C4 generate resonance. As a voltage is induced on the secondary winding L3 of the ballast choke L2, intrinsic resonance between the inductor LA and the condenser C6 of the control circuit 54 is generated, thereby generating such a voltage as to turn on the field effect transistor Q1 and turn off the field effect transistor Q2. When the resonance voltage between the ballast choke L2 and the condenser C4 is inverted thereafter, a voltage which is the reverse of the aforementioned voltage is generated on the secondary winding L3 so that the control circuit 54 generates such a voltage as to turn off the field effect transistor Q1 and turn on the field effect transistor Q2. Then, when the resonance voltage between the ballast choke L2 and the condenser C4 is inverted, the field effect transistor Q1 is turned on, while the field effect transistor Q2 is turned off. Thereafter, the field effect transistor Q1 and the field effect transistor Q2 are alternately turned on and off in the same manner as above to generate resonance voltage so that a starting voltage is applied to the arc tube 18 that is connected in parallel with the condenser C4, while one of the filament coils 44 is preheated. Thus, the arc tube 18 is started and becomes illuminated.

The Zener diode ZD1 and the Zener diode ZD2 unify the voltages on the gates of the field effect transistor Q1 and the field effect transistor Q2 and also protect the gates from an excessively high voltage.

Therefore, by using the N-channel field effect transistor Q1 and the P-channel field effect transistor Q2 and connecting the N-channel field effect transistor Q1 to the side where the electric potential is higher, both the N-channel field effect transistor Q1 and P-channel field effect transistor Q2 can be controlled by a single control circuit, i.e. the control circuit 54. As the control circuit 54 is provided with a resonance circuit consisting of the inductor L4 and the condenser C6, the size of the control circuit 54 can be reduced by reducing the number of the turns of the secondary winding L3, and it is also possible to reduce the difference between the voltage output from the control circuit 54 when no load is applied and the voltage output from the control circuit 54 under a load. If the resonance circuit consisting of the inductor L4 and the condenser C6 is omitted so that the output voltage from the secondary winding L3 is directly output, there may be a more than 10-fold difference in voltage output from the secondary winding L3 during no-load period and voltage output during on-load period. Although the magnitude of the difference depends on the relationship between the start-up voltage and the lamp voltage on the arc tube 18, such a large difference may either make it difficult for Zener diodes to perform unification of the gate voltages and protection of the gates or require expensive kinds of Zener diodes.

The present embodiment includes an arc tube 18 comprised of a plurality of U-shaped bent bulbs 31 having an inner tube diameter of 6 to 9 mm and arranged in parallel to one another in such a way that the height H2 of the bulb ranges from 50 to 60 mm; the length of the discharge path ranges from 200 to 300 mm; and that the total luminous flux is 700 lm when the lamp is lit at the lamp power of 7 to 15 W. By limiting the height H1 of the envelope 19 that is provided with the cover 14 within the range from 110 to 125 mm including the height of the base 12, to which said arc tube 18 is attached, the optimum criteria for the components can be determined in order to make the dimensions and the total luminous flux of the lamp correspond to those of a typical, 60 W-type light bulb for general illumination. The lower limit of the inner tube diameter of the tube is set at 6 mm as mentioned above, because the tube having an inner tube diameter of less than 6 mm requires a considerably high starting voltage and is therefore impractical.

As the embodiment includes an arc tube 18 comprised of a parallely arranged plurality of U-shaped bent bulbs 31, each of which has an outer tube diameter of 8 to 11 mm, a bulb wall from 0.7 to 1.0 mm thick and a curved crown P, it is possible to determine the tube diameter so that the dimensions and the total luminous flux of the lamp correspond to those of a typical, 60 W-type light bulb for general illumination and also determine the range of the thickness of the bulb wall which enables the increase of the inner surface area of the bulb while ensuring sufficient strength within the limit of the outer diameter of the bulb determined as above. Should the bulb wall have a thickness of 1.1 mm or more, the inner diameter of the bulb becomes too small with respect to the outer diameter of the bulb. Not only does this make it impossible to increase the inner surface area but also causes glass to accumulate in the bent portion 31a, at which each glass bulb is bent into a U-like shape. Such an accumulation of the glass makes the inner face of the bent portion 31a prone to cracks. By limiting the bulb wall thickness within the range from 0.7 to 1.0 mm, however, the embodiment is capable of reducing the danger of glass accumulating inside each bent portion 31a.

The maximum width of the circuit board 24 is so set as to range up to 1.2 times the maximum dimension along which the U-shaped bent bulbs 31 of the arc tube 18 are arranged, and the electrical components 26 that have relatively high heat resistance are mounted on one side of the circuit board 24, i.e. the side facing the arc tube 18, while the electrical components 25 having relatively low heat resistance are mounted on the other side of the circuit board 24. Thus, the embodiment is capable of reducing the size of the circuit board 24 while limiting the influence that heat exerts on the electrical components 25, 26 mounted on the circuit board 24. Consequently, the embodiment is capable of reducing the dimensions of the cover 14, which contains the circuit board 24 to a level equivalent to the dimensions of a typical light bulb. The influence that the heat from the electrodes exerts on the electrical components 26 can be limited by positioning the electrical components 26 apart from the electrodes of the arc tube 18 when the electrical components 26 are mounted on the side of the circuit board 24 facing the arc tube 18. Although it is recommended that the circuit board 24 have a circular shape, which is the most effective shape to ensure the space for mounting, the circuit board 24 may have a polygonal shape, such as a square, or an oval shape.

The arc tube 18 comprises three or more U-shaped bent bulbs 31, each of which has a smoothly bent crown P. These U-shaped bent bulbs 31 are serially connected to one another and concentrically arranged in such a manner that their crowns P are aligned in a circle and face the inner surface of the globe 17 and that the U-shaped bent bulbs 31 are spaced apart at a distance not exceeding the outer diameter of each bulb. Thus, this configuration makes it possible to dispose the arc tube 18 in the globe 17 that is formed in a compact shape resembling a typical light bulb. This embodiment is also capable of providing more uniform luminosity and more effective illumination even if the arc tube 18 is contained in such a compact globe 17.

As the arc tube 18 can be produced simply by forming three U-shaped bent bulbs 31 having an essentially identical shape and connecting them together, without the need of bending a glass tube into a complicated shape, the present embodiment is capable of reducing the production costs.

According to the configuration of the embodiment, the globe 17 includes an arc tube 18 comprised of a plurality of U-shaped bent bulbs 31 having an outer bulb diameter ranging from 8 to 11 mm and arranged parallel to one another in such a manner that the maximum width of the arc tube 18, i.e. the dimension along which U-shaped bent bulbs 31 are arranged, ranges from 32 to 43 mm. Furthermore, the maximum outer diameter of the globe 17 is in the range from 55 to 60 mm, and the globe 17 encloses the arc tube 18 in such a manner that A2>A1≧A3, wherein A1 represents the minimum distance between the globe 17 and each crown P of the arc tube 18; A2 represents the minimum distance between the maximum diameter portion of the globe 17 and the arc tube 18; and A3 represents the minimum distance between the base end of the globe 17 and the arc tube 18. Therefore, the embodiment is capable of determining the optimum criteria for luminance intensity distributing in the directions of the sides and the front end of the arc tube 18. Based on the above inequality, the optimum criteria for luminance intensity distributing in the directions of the sides and the front end of the arc tube 18 can be provided by setting A1 in the range from 2 to 8 mm, A2 in the range from 3 to 13 mm and A3 in the range from 2 to 8 mm.

In case, for example, a self-ballasted fluorescent lamp according to the present embodiment is used for a ceiling-recessed type down light, a large portion of the light is distributed toward the base. In other words, the characteristics of luminous intensity distribution of the lamp are similar to those of an incandescent lamp so that the reflector disposed in the luminaire achieves the designed optical effect, with the light effectively radiated to the reflector, which is located near the socket. In case the lamp is used for a table lamp or a similar luminaire which is designed to project the image of the internal light source onto a photo-diffusing shade, which may be made of cloth, setting the lamp so as to have luminous intensity distribution characteristics similar to those of an incandescent lamp enables the lamp to be used without any disagreeability.

Bonding the supporting member, the arc tube and the globe to one another by means of a bonding agent permits the heat to be efficiently radiated from the arc tube through the globe and also simplifies the structure, thereby enabling the reduction of the production costs.

Furthermore, the arc tube 18 is formed in a compact shape with its U-shaped bent bulbs 31 arranged in such a manner that their cross sections give the appearance of a triangle.

The distance w1 between the two straight portions 31b of each U-shaped bent bulb 31 is nearly identical to the distance w2 between each straight portion 31b and the U-shaped bent bulb 31 adjacent to said straight portion 31b, and the distances w1, w2 are in the range between 1 mm and 5 mm. Therefore, the arc tube 18 is disposed in a compact configuration.

Through the control circuit 54, the lighting circuit 16 operates the N-channel field effect transistor Q1 and the P-channel field effect transistor Q2. As the output from a single control circuit 54 thus controls two field effect transistor s in different conditions, the configuration of the circuit is simplified. By using a lighting circuit 16 which, as described above, requires only a minimal number of parts, the dimensions of the self-ballasted fluorescent lamp 10 can be further reduced.

As a lamp according to the embodiment has an outer shape resembling a typical light bulb having a rated power of approximately 60 W, it can be mounted on a luminaire designed for a typical light bulb. Thus, the embodiment expands the range of usage and also improves the appearance, permitting the lamp to be used without giving any disagreeability.

As shown in FIG. 3, the embodiment described above calls for securing the fitting edge 17a of the globe 17 by injecting a bonding agent 37 into the groove that is formed between the fitting step portion 35 and the cover 14. However, these parts may be affixed by using various means.

For example, a groove open at the bottom may be formed along the outer circumferential edge of the partition plate 33 that secures the arc tube 18 so that the globe 17 may be secured by fitting the fitting edge 17a of the globe 17 in this groove and injecting a bonding agent 37, such as a silicon-based bonding agent, into the groove. In an alternative configuration, the cover 14 and the partition plate 33 may respectively be provided with a catching portion and a catching portion receiver so that the cover 14 and the partition plate 33 can be secured by engaging the catching portion of the cover 14 and the catching portion receiver of the partition plate 33 with each other. This engagement of the partition plate 33 and the cover 14 can be done by inserting the partition plate 33 into the cover 14, or inserting the partition plate 33 into the cover 14 and then rotating the partition plate 33 in a given direction. According to this configuration, wherein the globe 17 is fastened only to the partition plate 33, the members forming the arc tube 18 and the components of the lighting circuit 16 can be separated and recovered more easily compared with the configuration which calls for attaching the arc tube 18 and the lighting circuit 16 to the partition plate 33 and fixing the globe 17 in the state where the cover 14 is attached to the partition plate 33. The above configuration has such other benefits that it improves the appearance of the lamp by simplifying the structure of the components exposed to the outside and that it is applicable to a luminaire of other types, e. g. a luminaire which does not use a globe 17.

As an alternative way to fix the globe 17, a notch or a groove may be formed in the partition plate 33, in the fitting step portion 35 or other location near the globe 17 and the arc tube 18, so that the cover 14, the globe 17, the partition plate 33 and the arc tube 18 may integrally be bonded together by introducing a bonding agent 37, such as a silicon type bonding agent, into this notch or the groove, thereby bonding the cover 14, the globe 17 and the partition plate 33 to one another. This configuration is capable of reducing the production costs, because its structure and production process are simpler than the configuration which calls for bonding the cover 14, the globe 17 and the partition plate 33 together and bonding the arc tube 18 to the partition plate 33 in a separate production process. In addition, it is capable of fastening the arc tube 18 to the globe 17 more securely. Furthermore, because the above configuration permits the heat to be conducted from the arc tube 18 through the bonding agent 37 to the globe 17 and efficiently radiated through the globe 17, it is capable of limiting deterioration of the luminous flux as well as increase in the temperature of the lighting circuit 16 and, consequently, capable of increasing the reliability of the circuit.

Although the lighting circuit 16 according to the embodiment described above is disposed in such a manner that a single circuit board 24 is positioned horizontally, in other words perpendicularly to the direction in which the base 12 is inserted, it does not matter whether a plurality of circuit boards are provided or the circuit board(s) are positioned perpendicularly, i.e. in parallel to the direction in which the base 12 is inserted.

The lighting circuit 16 may be composed by arranging a first circuit board and a second circuit board in such a manner that both circuit boards extend horizontally one above the other. In this embodiment, the upper first circuit board has electrical components 25 mounted thereon, while electrical components 25 are mounted on the underside of the second circuit board located at the lower side, and the first and second circuit boards are arranged with their soldered sides facing each other. The electrical components 25 consisting of components having relatively low heat resistance, such as electrolytic condensers or film condensers, are mounted on the first circuit board disposed at the side where the base 12 is located, while electrical components 25, a large part of which consists of those having relatively high heat resistance and having little thickness, such as resistors or chip components for rectification, are mounted on the second circuit board. The first and second circuit boards are electrically connected via a plurality of jumper wires, which may be two or three tinned wires, or flexible, film-like cables. When the first circuit board and the second circuit board are incorporated in the lamp, the mounting of these circuit boards is done by bending the jumper lines in such a manner that the soldered sides of these two circuit boards face each other. Disposed between the soldered sides of the first and second circuit boards is an insulating sheet which is approximately 1 mm thick and made of an insulating, heat-resistant material having an excellent heat insulating capability, such as a silicon-type film or the like. Thus, the soldered sides are insulated from each other, and conduction of heat from the arc tube 18 to the first circuit board is limited. By dividing the circuit components into two circuit boards, the planar dimensions of the lighting circuit 16 is reduced. By thus making the circuit mounting structure compact, the above configuration provides a lamp having a shape nearly identical to that of a typical light bulb. Dividing the circuit components into two circuit boards has such other benefits as to enable the easy protection of electrical components 25 having low heat resistance and improve the reliability and facilitates mass-production of the lamp.

In the configuration described above, components having low heat resistance, such as film condensers, and ballast chokes that generate a great amount of heat may undergo what is generally called 'silicon potting', i.e. a treatment which calls for placing silicon-based bonding agent on these components. Or a silicon-based resin rubber may be disposed in the space provided between the second circuit board and the partition plate 33 and filled with air. As thus using silicon potting or resin rubber enhances the outgoing radiation of heat from the electrical components 25 and makes it difficult for the heat from the arc tube 18 to be conducted to the electrical components 25, the temperature of the electrical components 25 can be reduced.

Although the configuration described above calls for sealing the ends of the arc tube 18 by means of line sealing using a mount, they may be sealed by means of pinch sealing that does not use a mount so that production costs can be reduced by excluding the process for producing mounts.

In an alternative configuration, the ends of the arc tube 18 may be sealed by means of pinching that uses a jig. In case of a conventional configuration, supporting the filament coils 44 is typically done by clamping each filament coil 44 with a pair of copper-weld wires 45 fixed to a bead glass (a mount bead). Therefore, depending on the position or inclination of each bead glass, pinching with a jig presents the danger of damaging the phosphor film applied to the inner surface of the arc tube 18 and consequently degrading the quality of the arc tube 18. According to the present embodiment, however, a mount used at each of the hot cathode fluorescent lamp permits the corresponding filament coil 44 to be directly clamped by two copper-weld wires 45, and each clamping width is limited to 7 mm or less. By thus eliminating the need of sophisticated control of the positions and inclinations of the bead glass, which control is essential in cases where bead glasses are used, the present embodiment simplifies the production process of the arc tube 18, thereby reducing its production costs, and also improves the quality of the arc tube 18. In case of the present embodiment, too, the copper-weld wires 45 at one side or the other are provided with an auxiliary amalgam 49.

Conventionally, sealing by pinching is done by directly pinching the dumet wires 46 of the copper-weld wires 45 with the arc tube 18 to seal the dumet wires 46 in the arc tube 18. As setting appropriate heating criteria, such as duration, temperature, etc. to securely bond the metal dumet wires 46 and the glass act tube 18 is difficult and requires sophisticated production technology, the conventional method of pinching described above not only makes the reduction of production costs difficult but also presents a problem in that the occurrence of any improper sealing would degrade the quality of the arc tube 18. One of the solutions to such problems is welding the glass to the dumet wires 46, i.e. the dumet portions, of the copper-weld wires 45 beforehand and then attaching the dumet wires 46 to the arc tube 18 and thus sealing them in the arc tube 18 by pinching. Doing so facilitates the sealing of the arc tube 18, thereby improving the quality of the arc tube 18, increasing the yield and reducing production costs. Furthermore, in the above configuration, bead glass, each of which is adapted to support two copper-weld wires 45, may be used.

According to the embodiment described above, a self-ballasted fluorescent lamp is provided with a globe 17 whose shape is similar to the glass bulb of a typical light bulb having a rated power consumption of approximately 60 W. However, the shape of the globe 17 is not limited to the glass light bulb of a typical light bulb, and various shapes are applicable. Furthermore, a configuration which does not have a globe 17 is also applicable.

Figure 9:
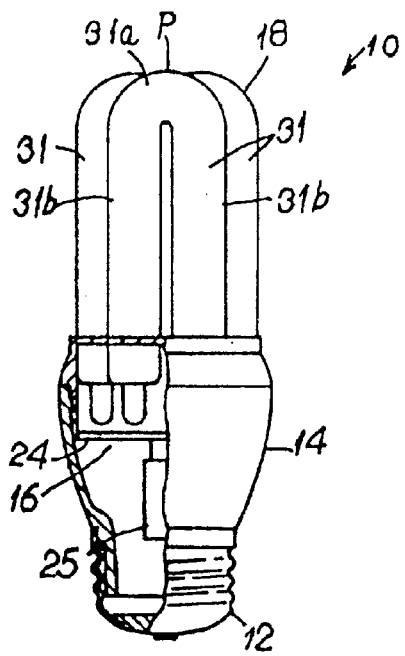
FIG. 9 is a side view of a partially-cutaway self-ballasted fluorescent lamp according to a seventh embodiment of the present invention.
Figure 10:
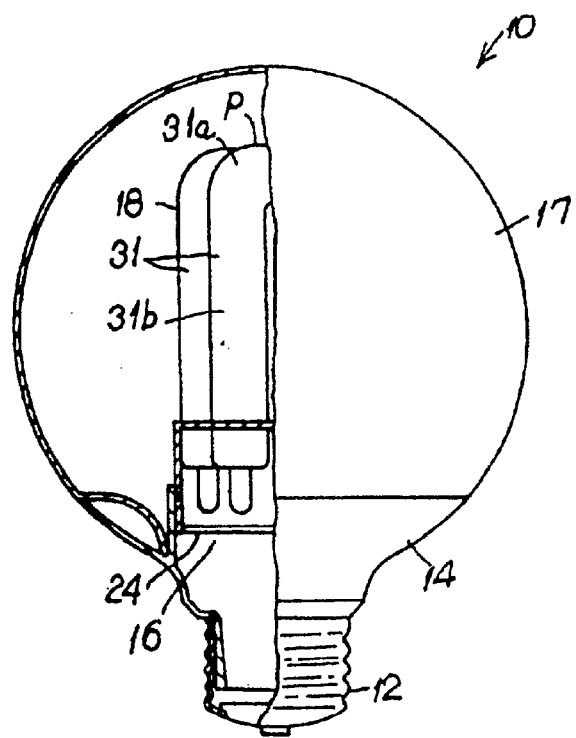
FIG. 10 is a side view of a partially-cutaway self-ballasted fluorescent lamp according to an eighth embodiment of the present invention.

FIG. 9 is a side view of a partially-cutaway self-ballasted fluorescent lamp according to a seventh embodiment of the present invention, and FIG. 10 is a side view of a partially-cutaway self-ballasted fluorescent lamp according to an eighth embodiment of the present invention.

In the embodiment shown in FIG. 9, the arc tube 18 is exposed from the cover 14, because a globe 17 is not provided. This configuration provides a self-ballasted fluorescent lamp which is even more compact, more suitable to be used for a luminaire that uses a typical light bulb, and improves the total luminous flux characteristic.

By forming a globe 17 in the shape of a ball, the embodiment shown in FIG. 10 is capable of providing a globe 17 whose shape resembles a ball-type glass bulb of a typical light bulb.

Although each one of the embodiments described above uses a milky white globe 17, a transparent globe, i.e. a clear-type globe, may be used.

A luminaire may be formed by attaching a self-ballasted fluorescent lamp 10 according to any one of the embodiments described above to the main body of a luminaire which is provided with a socket designed for a typical light bulb for general illumination. As a result, a luminaire having benefits described above, such as having more uniform luminance, being capable of improving the illumination efficiency and reducing production costs, can be provided.

According to each embodiment described above, an arc tube 18 is formed by connecting three U-shaped bent bulbs 31. However, the shape of the arc tube 18 is not limited to such a configuration; the lamp length may be reduced by arranging a plurality of U-shaped or H-shaped bent bulbs, e.g. two, three or four bulbs, in parallel with one another so as to form a discharge path having four, six or eight axes extending in the lengthwise direction of the lamp.

Next, a self-ballasted fluorescent lamp and a luminaire according to the ninth embodiment of the invention are explained hereunder, referring to drawings.

Figure 11:
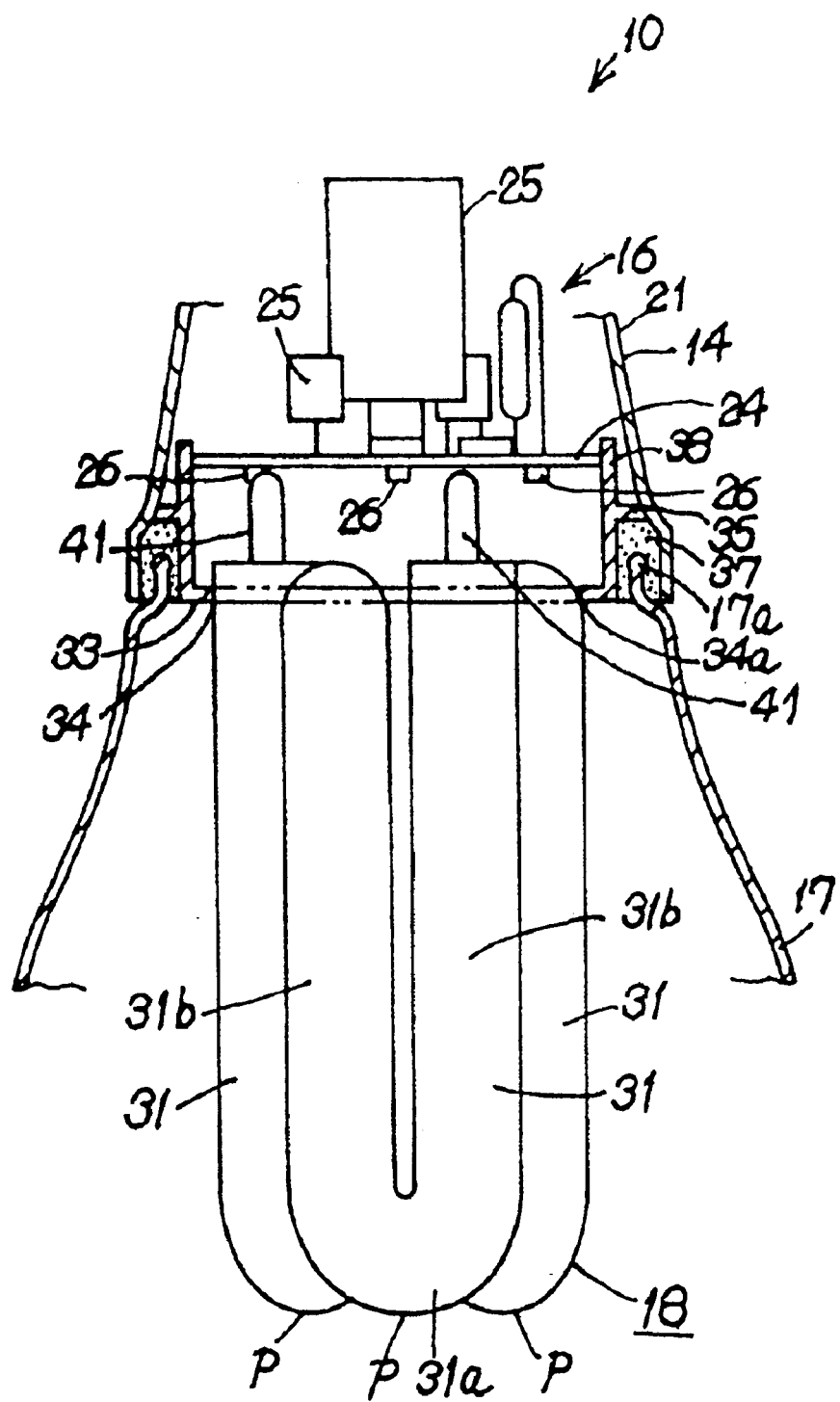
FIG. 11 is a sectional view of a part of a partially-cutaway self-ballasted fluorescent lamp according to a ninth embodiment of the present invention.
Figure 12:
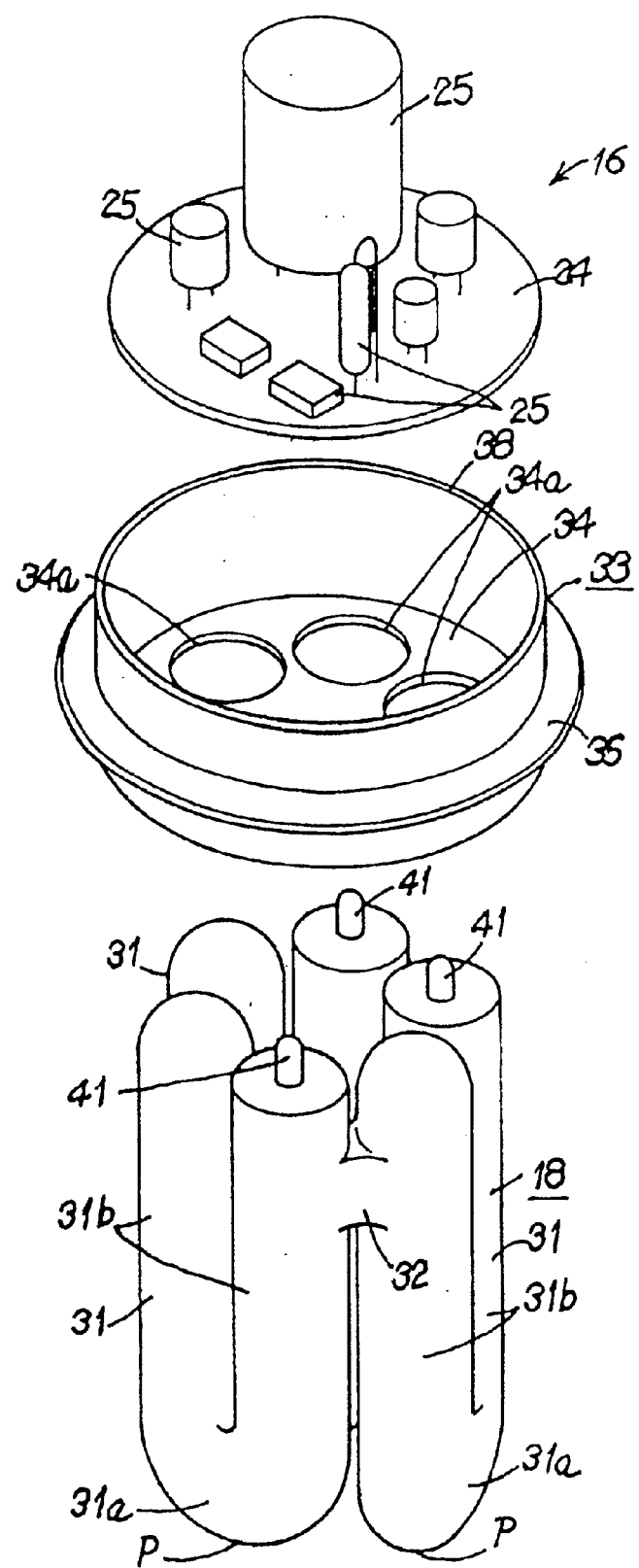
FIG. 12 is a perspective of a part of said self-ballasted fluorescent lamp.

FIG. 11 is a sectional view of a part of a self-ballasted fluorescent lamp according to an embodiment of the present invention; FIG. 12 is a perspective of a part of said self-ballasted fluorescent lamp; and FIG. 13 is a schematic illustration of the self-ballasted fluorescent lamp as viewed from the bottom.

The self-ballasted fluorescent lamp according to the ninth embodiment has the same appearance as that of the lamp shown in FIG. 1.

Figure 13:
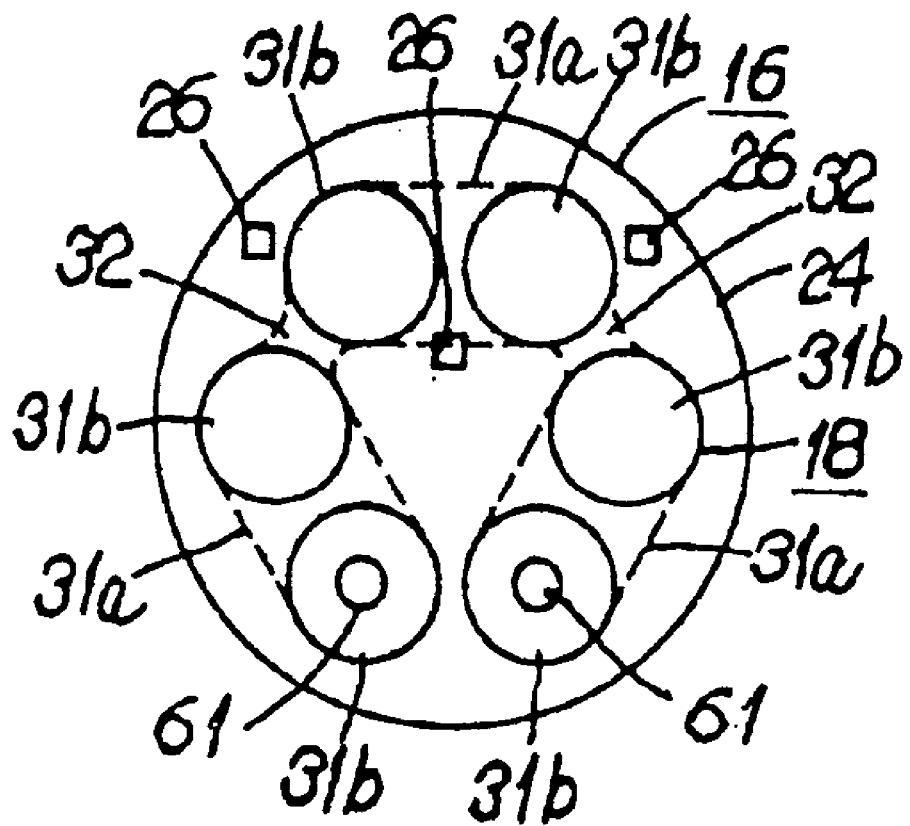
FIG. 13 is a schematic illustration of said self-ballasted fluorescent lamp as viewed from the bottom. Furthermore.

In FIGS. 11 through 13, numeral 10 denotes a self-ballasted fluorescent lamp. The self-ballasted fluorescent lamp comprises a cover 14 having a base 12, a lighting circuit 16 contained in the cover 14, a translucent globe 17, and an arc tube 18 contained in the globe 17. The globe 17 and the cover 14 together form an envelope 19 that has such an outer shape as to have nearly the same dimensions as standard dimensions of an incandescent lamp having a rated power of approximately 60 W. In other words, the lamp length H1 of the envelope 19 ranges from approximately 120 to 125 mm including the base 12; the diameter D1 of the envelope 19, i.e. the outer diameter of the globe 17, is approximately 60 mm; and the maximum diameter D2 of the cover 14 is approximately 40 mm. Further, in the explanation hereunder, the side where the base 12 is located is referred to as the upper side, while the side where the globe 17 is located is referred to as the lower side.

The cover 14 is provided with a cover body 21 that may be formed of a heat resistant synthetic resin such as polybutylene terephthalate (PBT). The cover body 21 has an approximately cylindrical shape that flares downward. The base 12, which may be of the E26 Edison type, is disposed over the top of the cover body 21 and fastened thereto with a bonding agent, or by such other means as crimping.

The globe 17 may be transparent or photo-diffusing milky white. The globe 17 is formed of glass, synthetic resin or the like into a smoothly curved shape that is nearly identical to the glass bulb of an incandescent lamp. The edge of the opening of the globe 17 is formed into a fitting edge 17a to be fitted in an opening at the bottom of the cover 14. The globe 17 may be formed in combination with another member, such as a diffusion film, in order to make luminance of the lamp more uniform, or the globe 17 may entirely be omitted.

The lighting circuit 16 contained in the cover 14 has a circuit board (a PC board) 24 disposed horizontally, in other words perpendicularly to the lengthwise direction of the arc tube 18. A plurality of electrical components 25, 26 are mounted on both sides of the circuit board 24, i.e. the upside facing the base 12 and the underside facing the arc tube 18, thereby forming an inverter circuit (a high-frequency lighting circuit) for conducting high frequency lighting.

The electrical components 25 mainly consisting of components having relatively low heat resistance, such as electrolytic condensers and film condensers, are arranged on the upside of the circuit board 24, while thin, small chip-shaped electrical components (chip components) 26 having relatively high heat resistance are arranged on the underside of the circuit board 24. Said chip-shaped electrical components (chip components) 26 consist of rectifiers (rectifying devices or diode bridges), transistors, resistors, etc. and are arranged in a package approximately 2 to 3 mm in thickness. The circuit board 24 has a shape resembling a disk having a diameter less than that of a roughly circular shape with a diameter of 40 mm. Wires drawn out of the circuit board 24 are connected to the electrodes 61 of the arc tube 18.

The arc tube 18 consists of three U-shaped bent bulbs 31 that are tubes having nearly identical shapes and arranged at given locations. The three U-shaped bent bulbs 31 are connected to one another via communicating tubes 32 and thus form a single discharge path. An electrode 61 having a filament coil and other necessary parts is disposed at each end of the discharge path. Each U-shaped bent bulb 31 is provided with a phosphor film, which is formed on the inner surface of the U-shaped bent bulb 31, hermetically contained a rare gas, such as argon, and mercury. Each U-shaped bent bulb 31 is a glass cylindrical bulb having an outer tube diameter of 10 mm and an inner tube diameter of 8 mm. In other words, the wall thickness of each bulb is 1 mm. Each U-shaped bent bulb 31 is formed into a smoothly curved U-like shape having a crown P by bending said glass bulb, which is 110 mm long, at the middle portion so that the bulb 31 has a bent portion 31a that is smoothly turned back on itself and a pair of straight portions 31b extending parallel to each other and integrally connected to the bent portion 31a.

The arc tube 18 is fastened to a partition plate 33, which may be referred to as a supporting member in the claims or other parts of the specification and serves as a fluorescent lamp fastening member as well as a lighting circuit fastening member. The partition plate 33 is fastened to the cover 14. To be more specific, the partition plate 33 has a disk-shaped base portion 34 which is provided with mounting holes 34a. The arc tube 18 is fastened to the partition plate 33 with the ends of the U-shaped bent bulbs 31 respectively inserted into the mounting holes 34a and secured therein by means of, for example, bonding the regions of the bulbs to the base portion with an adhesive agent. A fitting step portion 35 that extends upward and then outward is formed around the outer edge of the base portion 34. These members are fastened together by fitting the fitting step portion 35 in the cover 14 and filling the gap between the fitting step portion 35 and the cover 14 with a bonding agent 37 in such a state that the fitting edge 17a of the globe 17 is fitted between the fitting step portion 35 and the cover 14. A mounting edge 38 that may have a cylindrical shape rises from the top of the fitting step portion 35, and the circuit board 24 of the lighting circuit 16 is fitted, bonded or otherwise attached to the mounting edge 38.

One of the two ends of each U-shaped bent bulb 31 is sealed by means of line sealing with a mount, pinch sealing without a mount, or the like. A minute tube 41 that may otherwise be called an exhaust tube is welded to the other end of each U-shaped bent bulb 31 to discharge the air. The minute tube 41 is designed such that it may be provided with an amalgam if it is necessary. An electrode 61 is disposed at the end of each U-shaped bent bulb 31 that is located at an end of the discharge path of the arc tube 18 in such a state that the filament coil of each electrode 61 is supported between a pair of copper-weld wires (lead-in wires). Via each respective dumet wire attached to the glass end of the U-shaped bent bulb 31 and thus sealed in the bulb, each copper-weld wire is connected to a lamp wire that is drawn out of the U-shaped bent bulb 31. Said lamp wires are electrically connected to the lighting circuit. If it is necessary, one of the copper-weld wires may be provided with an auxiliary amalgam.

In the state where the self-ballasted fluorescent lamp 10 is assembled, as shown in FIG. 13, the chip-shaped electrical components 26 mounted on the underside of the circuit board 24 are located apart from the ends of the U-shaped bent bulbs 31 of the arc tube 18, particularly from the minute tubes 41 projecting from the ends of the U-shaped bent bulbs 31. The electrical components 26 are also spaced apart from the electrodes 61, in other words they are positioned near the U-shaped bent bulbs 31 that are not provided with an electrode 61.

When the self-ballasted fluorescent lamp 10 is assembled in the manner described above, the arc tube 18 is housed in the globe 17 at a given position. To be more specific, in the state where the self-ballasted fluorescent lamp 10 is assembled, the crowns P of the U-shaped bent bulbs 31 are aligned at regular intervals in a circle whose center is on the central axis of the self-ballasted fluorescent lamp 10 extending in the vertical direction, and the straight portions 31b of the U-shaped bent bulbs 31, too, are aligned at regular intervals in a circle whose center corresponds to the central axis of the lamp. The straight portions 31b are aligned in a circle in such a manner that the distance W between each straight portion 31b and its adjacent straight portion 31b is less than 10 mm, in other words shorter than the outer diameter of each U-shaped bent bulb 31.

The self-ballasted fluorescent lamp 10 structured as above has such characteristics that, when a rated input power is 14

W, a high frequency power of 12.5 W is applied to the arc tube 18, producing a lamp current of 280 mA, a lamp voltage of 65 V and a total luminous flux of 810 lm, which results from the use of the three band phosphor.

By mounting electrical components 25, 26 on both ends the circuit board 24 as described above, the present embodiment is capable of reducing the size of the circuit board 24 and also reducing the diameter of the cover 14, which is located near the base 12.

As the circuit board 24 is so formed as to have an outer diameter nearly identical to the inner diameter of the cover 14 and cover the interior of the cover 14, it is possible to arrange components by making use of the space inside the cover 14 to the full extent and, consequently, reduce the diameter of the portion of the cover 14 near the base 12.

According to the present embodiment, the circuit board 24 and the arc tube 18 are positioned one directly above the other. However, as the chip-shaped electrical components 26 mounted on the side of the circuit board 24 facing the arc tube 18 are so positioned as to not face the ends of the U-shaped bent bulbs 31 of the arc tube 18, particularly the portions of the ends of the U-shaped bent bulbs 31 from which the minute tubes 41 project, the embodiment described above is capable of preventing interference of the arc tube with the electrical components 26, limiting the influence of the heat from the arc tube, and reducing the length of the lamp by the thickness of the chip-shaped electrical components 26, i.e. 2 to 3 mm.

By disposing the electrical components 26 mounted on the side of the circuit board 24 facing the arc tube 18 at locations removed from the electrodes 61 of the arc tube 18, the embodiment is also capable of limiting the influence that the heat generated by the electrodes 61 exerts on the electrical components 26, thereby increasing the reliability of the electrical components.

As the arc tube 18 is formed by parallely arranging U-shaped bent bulbs 31 that have a U-like shape, the length of the lamp can be reduced.

By reducing the length of the bulb as well as the diameter of the portion of the lamp near the base 12, e.g. the portion extending up to 30 mm from the base 12, so as to make the shape of the lamp resemble a typical PS-type electric bulb, the embodiment described above provides a lamp having a shape similar to that of an incandescent lamp. Therefore, the self-ballasted fluorescent lamp 10 described above can be mounted on a luminaire designed for an incandescent lamp. Thus, the embodiment expands the range of its usage and also improves the appearance of the lamp, permitting the lamp to be used without giving any disagreeability.

According to the embodiment described above, an arc tube 18 is formed by connecting three U-shaped bent bulbs 31. However, the shape of the arc tube 18 is not limited to such a configuration; the lamp length may be reduced by arranging a plurality of U-shaped or H-shaped tubes, e.g. two, three or four tubes, in parallel with one another so as to form a discharge path having four, six or eight axes extending in the lengthwise direction of the lamp. Furthermore, although the lighting circuit 16 is comprised of a single circuit board 24 that is positioned horizontally, it may consists of a plurality of circuit boards.

A luminaire may be formed by attaching a self-ballasted fluorescent lamp 10 according to any one of the embodiments described above to the main body of a luminaire which is provided with a socket designed for an incandescent lamp or the like. Thus formed luminaire has the various benefits of the self-ballasted fluorescent lamp 10 described above.

Every configuration described above is applicable to a bent-tube type fluorescent lamp, which may be installed in a luminaire using a ball-shaped fluorescent lamp or the like.

Next, a fluorescent lamp according to yet another embodiment of the invention is explained hereunder, referring to drawings.

Figure 14:
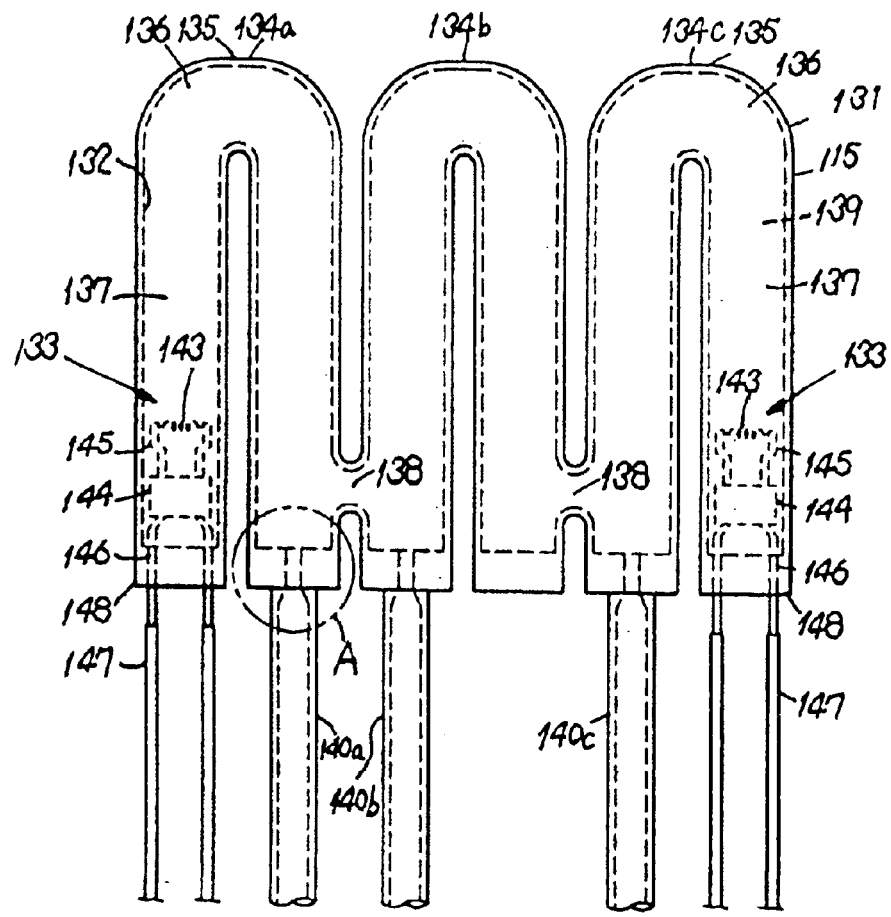
FIG. 14 illustrates a fluorescent lamp according to a tenth embodiment of the present invention, wherein (a) is an exploded view of a bulb of the fluorescent lamp, and (b) is an enlarged sectional view of the part A in FIG. 14 (a).
Figure 14:
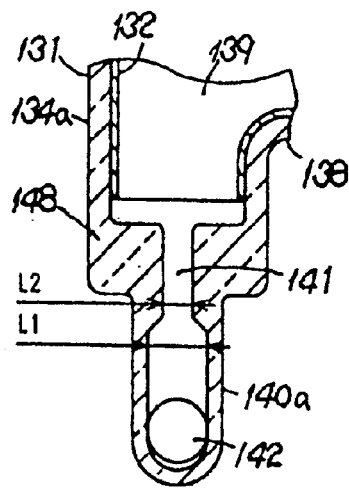
Figure 15:
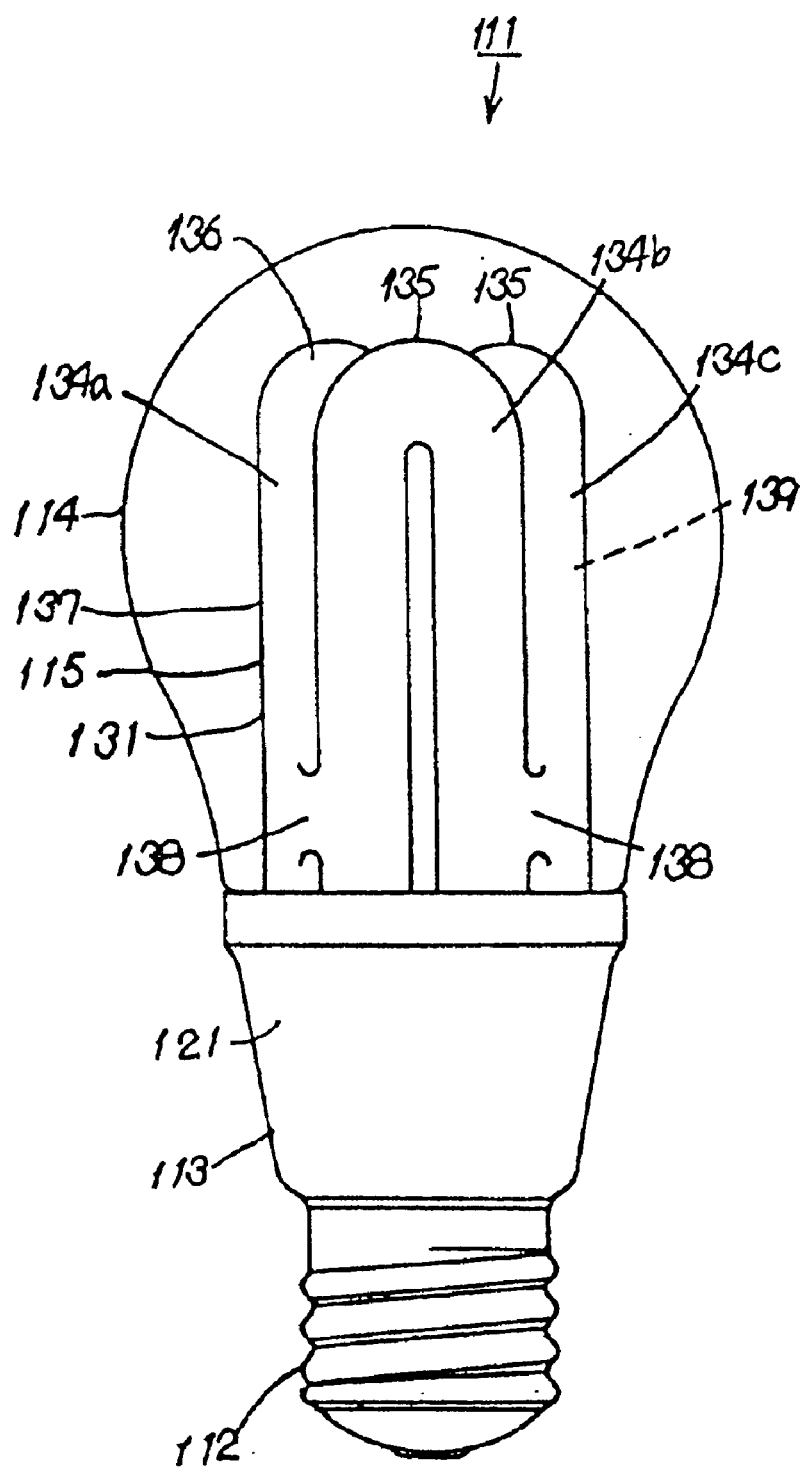
FIG. 15 is a side view of said fluorescent lamp.
Figure 16:
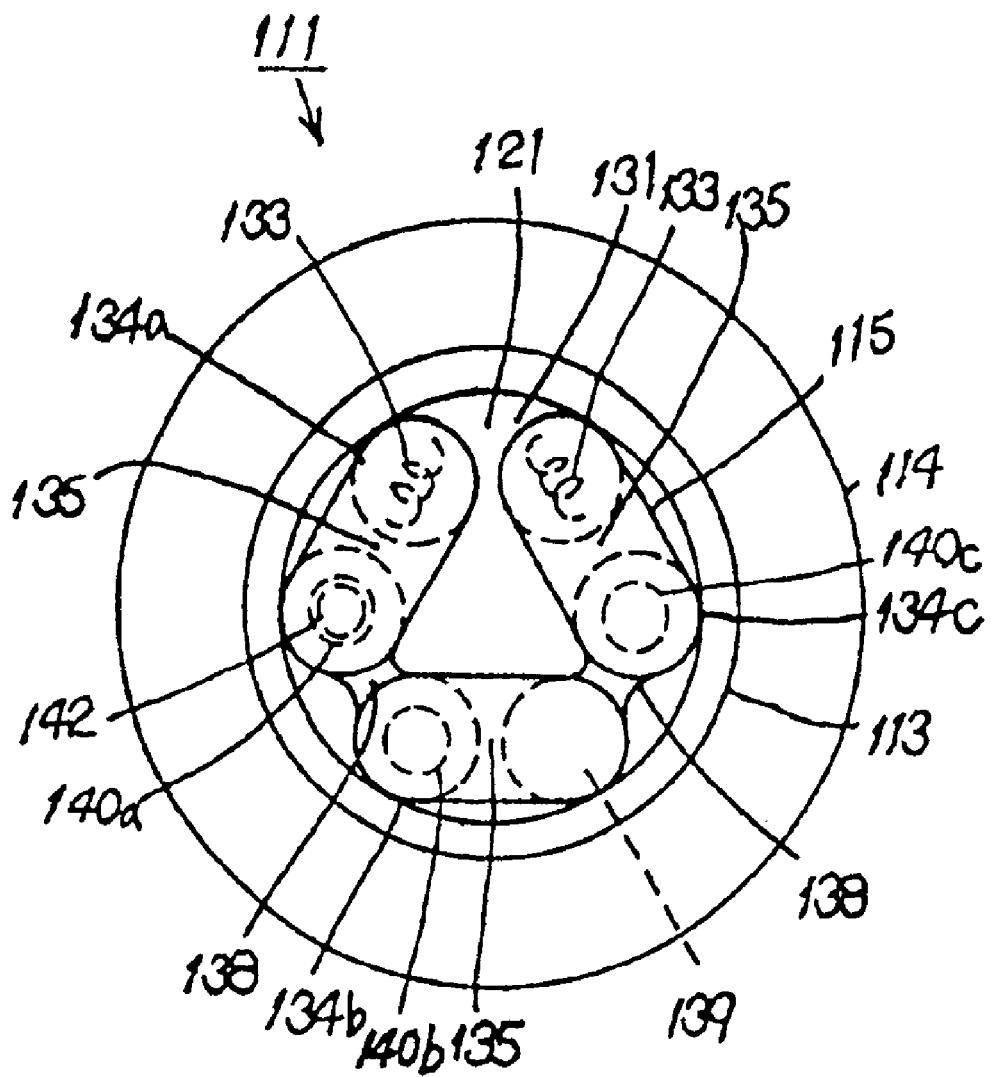
FIG. 16 is a top view of same, wherein the globe of said fluorescent lamp is illustrated as if the inside contents were visible.
Figure 17:
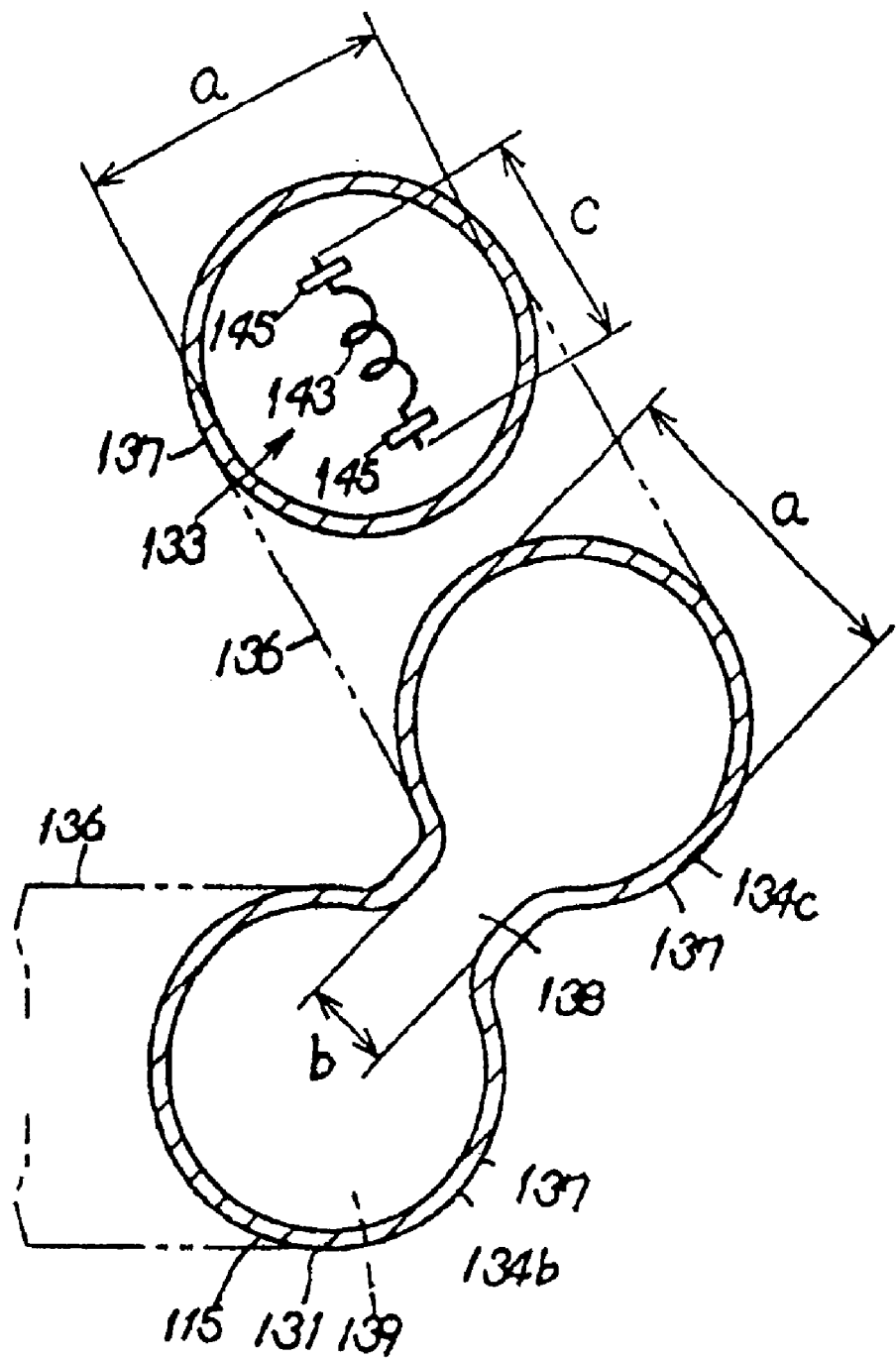
FIG. 17 is a sectional view of a part of said fluorescent lamp.

The tenth embodiment is shown in FIGS. 14 through 17, wherein FIG. 14($a$) is an exploded view of a bulb of the fluorescent lamp; FIG. 14($b$) is an enlarged sectional view of the part A in FIG. 14($a$); FIG. 15 is a side view of said fluorescent lamp; FIG. 16 is a top view of same, wherein the globe of said fluorescent lamp is illustrated as if the inside contents were visible; and FIG. 17 is a sectional view of a part of said fluorescent lamp.

In the drawings, numeral 111 denotes a fluorescent lamp having a shape of a light bulb (hereinafter called self-ballasted fluorescent lamp). The self-ballasted fluorescent lamp 111 comprises a cover 113 having an E26-type base 112, a lighting circuit (not shown) contained in the cover 113, a translucent globe 114, and an arc tube 115 contained in the globe 114. The cover 113 and the globe 114 together form an envelope 19 that has such an outer shape as to have nearly the same dimensions as standard dimensions of a typical light bulb for general illumination. In other words, the height of the envelope ranges from approximately 110 to 125 mm including the height of the base 112, while the diameter of the envelope, i.e. the outer diameter of the globe 114, ranges from approximately 55 to 60 mm. Further, in the explanation hereunder, the side where the base 112 is located is referred to as the lower side, while the side where the globe 114 is located is referred to as the upper side.

The cover 113 is provided with a cover body 121 that may be formed of a heat resistant synthetic resin such as polybutylene terephthalate (PBT). The cover body 121 has an approximately cylindrical shape that flares upward. The base 112, which may be of the E26 type, is disposed over the bottom of the cover body 121 and fastened thereto by way of bonding, crimping or any other appropriate means.

The globe 114 may be transparent or photo-diffusing milky white. The globe 114 is formed of glass, synthetic resin or the like into a smoothly curved shape nearly identical to the glass bulb of a light bulb, with the edge of its opening fitted in an opening at the top of the cover 113 and fastened thereto. The luminance of the lamp may be made more uniform by forming the globe 114 in combination with another member, such as a diffusion film.

A combination of such a globe 114 as described above and a bulb 131, which will be described later, increases the output power of the light irradiated in the direction of the base 112 and thereby achieves luminous intensity distribution whose characteristics are similar to those of a light bulb for general illumination.

The lighting circuit is comprised of an inverter circuit (a high-frequency lighting circuit) for lighting the arc tube 115 at a high frequency. The lighting circuit consists of an approximately disk-shaped board on which electronic components are mounted. The maximum outer diameter of the lighting circuit is 40 mm.

The arc tube 115 has a bulb 131. A film of phosphor 132 is formed on the inner surface of the bulb 131. The bulb 131 hermetically contains filler gas which is a rare gas, such as argon, and mercury. The bulb 131 also contains a pair of electrodes 133, which are respectively disposed at the two ends of the bulb 131.

The bulb 131 has three tubular bodies 134$a$, 134$b$, 134$c$, each of which may be an approximately cylindrical glass tube having an outer tube diameter ranging from 8 to 11 mm and an inner tube diameter ranging from 6 to 9 mm and a wall thickness ranging from 0.7 to 1.0 mm, and formed into a smoothly curved U-like shape having a crown 135 by bending said glass tube at the middle of its length, which ranges from approximately 110 to 130 mm. Therefore, each tubular body 134a, 134b, 134c has a bent portion 136 that is smoothly turned back on itself and a pair of straight portions 137 extending parallel to each other and integrally connected to the respective two ends of the bent portion 136.

The two ends of the tubular body 134b, which is located at the middle part of the bulb 131, are respectively connected through communicating tubes 138 to one end of the tubular body 134a and one end of the tubular body 134c, which are respectively located at the ends of the bulb 131, so that a single continuous discharge path 139 having a length ranging from 200 to 300 mm is formed. In the state where the bulb 131 is incorporated in the self-ballasted fluorescent lamp 111, the crowns 135 (the bent portions 136) of the tubular bodies 134a, 134b, 134c are aligned at regular intervals in a circle whose center is on the central axis of the self-ballasted fluorescent lamp 111 extending in the vertical direction, and the straight portions 137 of the tubular bodies 134a, 134b, 134c, too, are aligned at regular intervals in a circle whose center corresponds to the central axis of the lamp. To be more specific, the straight portions 137 of each tubular body 134a, 134b, 134c are arranged along each respective side of a triangle that forms a cross section of the bulb 131. The straight portions 137 aligned in a circle are formed so that the distance between each straight portion 137 and its adjacent straight portion 137 is shorter than the outer diameter of each tubular body 134a, 134b, 134c.

The tubular bodies 134a, 134b, 134c are respectively provided with cylindrical minute tubes 140a, 140b, 140c that may otherwise be called exhaust tubes. Each minute tube 140a, 140b, 140c communicates with the corresponding tubular body 134a, 134b, 134c and projects from an end thereof. However, each one of the minute tubes 140a, 140c of the tubular bodies 134a, 134c, which are respectively located at the two ends of the bulb 131 projects from the non-electrode end, i.e. the end opposite the end at which an electrode 133 is attached. The air is discharged from the bulb 131 through the minute tubes 140a, 140b, 140c or a part of these minute tubes 140a, 140b, 140c, while the filler gas is introduced. After the filler gas has replaced the air, the bulb 131 is sealed by fusing the minute tubes 140a, 140b, 140c. FIG. 14 schematically illustrates the state of the minute tubes 140a, 140b, 140c prior to fusion. Each minute tube 140a, 140b, 140c has an open end portion 141 that communicates with the corresponding tubular body 134a, 134b, 134c. The inner diameter L2 of each open end portion 141 is smaller than the inner diameter L1 of the barrel portion of each minute tube 140a, 140b, 140c.

Of the minute tubes 140a, 140b, 140c of the tubular bodies 134a, 134b, 134c, the minute tube 140a (or the minute tube 140c), which is located closest to either electrode 133 hermetically contains an amalgam 142. Said minute tube 140a (or the minute tube 140c) is located at the non-electrode end of the tubular body 134a (or the tubular body 134c) at either end of the bulb 131, non-electrode end meaning the end opposite the end at which the electrode 133 is enclosed. The amalgam 142 is enclosed in the minute tube 140a (or the 140c), when the minute tube is sealed. The amalgam 142 is an alloy of bismuth, indium and mercury formed into a nearly spherical shape whose diameter is greater than that of the open end portion 141 of the minute tube 140a and has the function of controlling the pressure of the mercury vapor in the bulb 131 within an appropriate range. The amalgam 142 may be formed of an alloy that consists of tin and lead in addition to bismuth and indium.

If it is necessary, an auxiliary amalgam may be disposed in the bulb 131 so as to absorb mercury floating in the bulb when the lamp is turned off, and release the absorbed mercury during the early stage of lighting, including the moment when the lighting is initiated.

Each electrode 133 has a filament coil 143 supported by a pair of copper-weld wires (lead-in wires) 145, each of which is fixed by a bead stem 144. Via a dumet wire 146 attached to the glass of the end of the corresponding tubular body 134a, 134c and thus sealed in the tubular body, each copper-weld wire 145 is connected to a wire 147 that is drawn out of each respective tubular body 134a, 134c. Each dumet wire 146 is enclosed in the bulb by means of a pinch seal portion 148 provided at the end of the bulb. When the bulb 131 is installed in a self-ballasted fluorescent lamp 111, the wires 147 are connected to the lighting circuit.

FIG. 17 illustrates the relationships that the inner diameter b of each communicating tube 138 and the width c of each electrode 133 have with respect to the inner tube diameter a of the bulb 131. The communicating tubes 138 are formed by joining the apertures of the tubular bodies to one another. Said apertures are formed prior to the sealing of the minute tubes 140a, 140b, 140c, by heating and melting the tubular bodies and then breaking through the appropriate portions by blowing air through the tube walls.

The relationship between the inner tube diameter a of the bulb 131 and the inner diameter b of each communicating tube 138 is set such that $0.6 < a/b < 1.0$ in order to reduce the lamp starting voltage and improve the rise of the light output.

The relationship between the inner tube diameter a of the bulb 131 and the width c of each electrode 133 is set such that $(a-c)/2 < 1.5$ mm so that the electrodes 133 generate excessive heat when the lamp reaches the last stage of its life and that the generated heat melts the bulb 131 and causes the filler gas to leak from the bulb, thereby turning off the lamp to become unilluminated.

The self-ballasted fluorescent lamp 111 structured as above has characteristics such that, when a rated input power is 14 W, a high frequency power of 12.5 W is applied to the arc tube 18, producing a lamp current of 280 mA, a lamp voltage of 65 V and a total luminous flux of 810 lm, which results from the use of the three band phosphor.

Next, the function of the embodiment described above is explained.

By enclosing the amalgam 142 in the minute tube 140a, which is the one, among the minutes tubes 140a, 140b, 140c located at the middle portion of the bulb 131, closest to one of the electrodes 133, it is possible to prevent the temperature of the amalgam 142 from becoming too high due to the influence of the heat from the electrode 133 and also facilitate the warming of the amalgam 142 at the initiation of lighting.

In other words, compared with the configuration where an amalgam 142 is disposed at the end of the bulb 131 at which an electrode 133 is attached, the above configuration according to the present embodiment is capable of reducing the influence that heat from an electrode 133 exerts on the amalgam 142, thereby preventing the temperature of the amalgam 142 from becoming too high, and also capable of limiting the pressure of the mercury vapor within an appropriate range. In addition, by reducing the distances from the amalgam 142 to the two respective ends of the bulb 131, the above configuration is capable of making the pressure of the mercury vapor in the entire bulb 131 uniform and stable. Furthermore, compared with the configuration where an amalgam 142 is disposed in the tubular body 134b at the middle portion of the bulb 131, the present embodiment permits the amalgam 142 to be heated easily. Therefore, the embodiment is capable of improving the rising characteristics of the luminous flux and consequently reducing the time taken for the luminous flux to become stable.

As described above, by enclosing the amalgam 142 in the minute tube 140a (or minute tube 140c), which is the one, among the minutes tubes 140a, 140b, 140c located at the middle portion of the bulb 131, closest to one of the electrodes 133, the embodiment is capable of preventing an unfavorable influence of the heat from the electrode 133 from increasing the temperature of the amalgam 142 too much and also facilitating the warming of the amalgam 142 at the initiation of lighting. As a result, it is possible to limit the pressure of the mercury vapor within an appropriate range and reduce the time taken for the luminous flux to become stable when lighting is initiated.

By enclosing the amalgam 142 in the minute tube 140a located at the non-electrode end of the tubular body 134a that is located at an end of the bulb 131, the embodiment is capable of maintaining the pressure of the mercury vapor within an appropriate range and reducing the time taken for the luminous flux to become stable when lighting is initiated.

As the inside of the minute tube 140a, in which the amalgam 142 is contained, is wider than the open end portion 141 that communicates with the inside of the tubular body 134a, the amalgam 142 can snugly be contained in the minute tube 140a.

In cases where the inside of the bulb 131 is narrow, in other words where the inner tube diameter of the bulb 131 ranges from 6 to 9 mm, it is difficult to form minute tubes 140a, 140c, together with the electrodes 133, at the ends (the ends where the electrodes 133 are formed) of the tubular bodies 134a, 134c, which are respectively located at the two ends of the bulb 131. On the other hand, the minute tubes 140a, 140c can easily be formed at the non-electrode ends of the tubular bodies 134a, 134c located at the two ends of the bulb 131. Forming the minute tubes 140a, 140c at the non-electrode ends also eliminates the need of excessively reducing the diameter of the minute tubes 140a, 140b, 140c even if the bulb 131 is narrow with its inner tube diameter ranging from 6 to 9 mm.

As the three tubular bodies 134a, 134b, 134c are arranged in such a manner as to respectively correspond to the sides of a triangle that forms a cross section of the bulb 131, the bulb 131 can be made into a compact shape without the need of being bent into a complicated shape, such as one resembling a saddle. A compact bulb 131 formed in the manner as described above can be used for a self-ballasted fluorescent lamp 111.

In cases where the bulb 131 is narrow with its inner tube diameter ranging from 6 to 9 mm, there arise such problems that the secondary voltage on the lighting circuit becomes too high, making it necessary to increase the lamp initiating voltage and also slowing the rise of light output, and that, when the lamp reaches the last stage of its life, the electrodes 133 generate heat and exert a thermal influence on the cover body 121 that supports the bulb 131. These problems can be solved by setting the relationship between the inner tube diameter a of the bulb 131 and the inner diameter b of each communicating tube 138 such that $0.6<a/b<1.0$ and the relationship between the inner tube diameter a of the bulb 131 and the width c of each electrode 133 such that $(a-c)/2<1.5$ mm.

By thus setting the relationship between the inner tube diameter a of the bulb 131 and the inner diameter b of each communicating tube 138 such that $0.6<a/b<1.0$ so that the inner diameter b of each communicating tube 138 exceeds the inner tube diameter a of the bulb 131, the embodiment is capable of reducing the lamp starting voltage and improving the rise of the light output. The relationship between the inner tube diameter a of the bulb 131 and the width c of each electrode 133 is set such that $(a-c)/2<1.5$ mm in order to bring the inner surface of the bulb 131 and each electrode 133 in close proximity to each other. Therefore, when the lamp reaches the last stage of its life, heat generated by the electrodes 133 causes a leak in the bulb 131 and stops the lighting circuit, thereby causing the arc tube to become unilluminated.

A luminaire may be formed by attaching a self-ballasted fluorescent lamp 111 according to the embodiment described above to the main body of a luminaire which is provided with a socket designed for a typical light bulb.

If it is necessary, the embodiment may include an auxiliary amalgam, which serves to improve the rising characteristics of luminous flux by releasing mercury at the initial stage of lighting.

Figure 18:
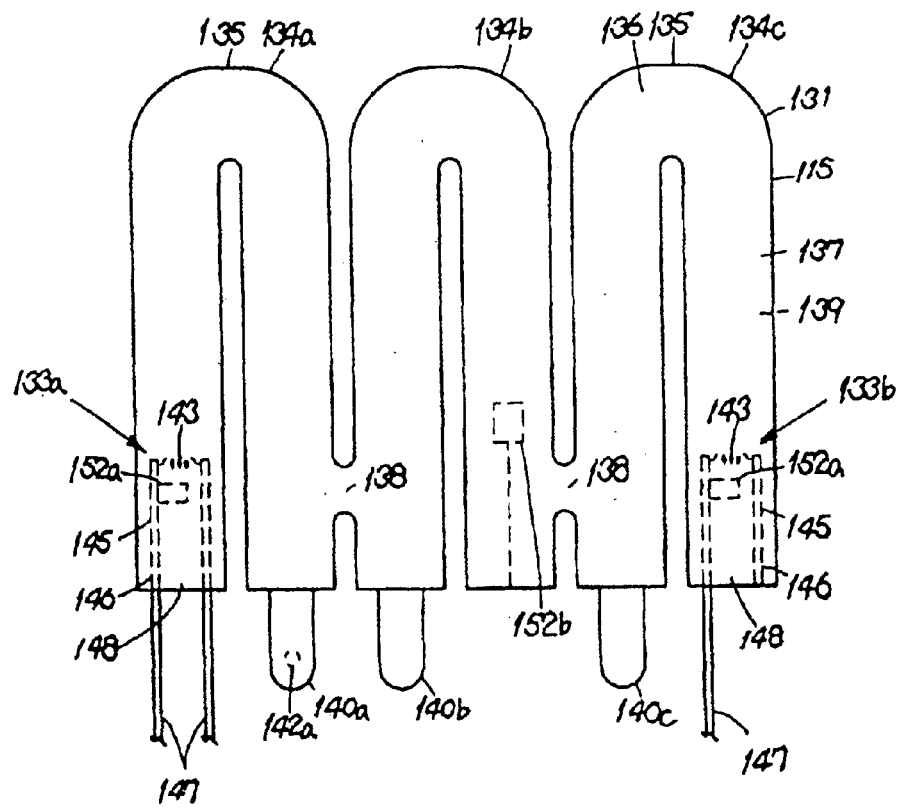
FIG. 18 is an exploded view of a bulb of a fluorescent lamp according to an 11th embodiment of the present invention.
Figure 19:
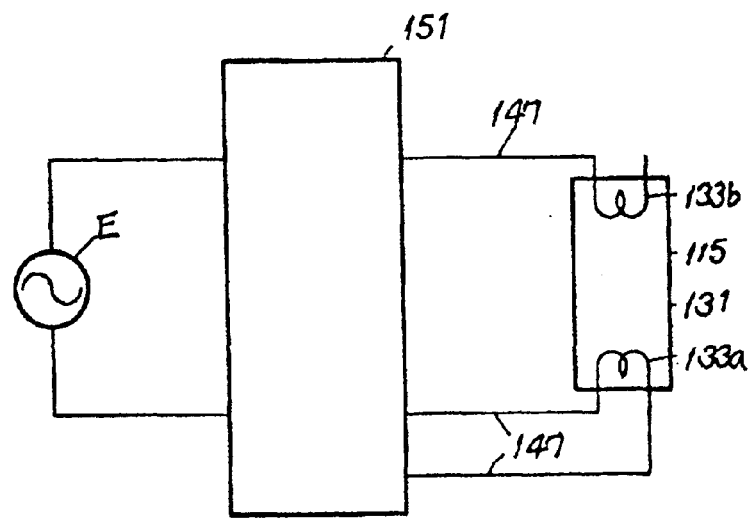
FIG. 19 is a circuit diagram of a lighting circuit of said fluorescent lamp.

The 11th embodiment is shown in FIGS. 18 and 19, wherein FIG. 18 is an exploded view of the bulb of a fluorescent lamp, and FIG. 19 is a circuit diagram of a lighting circuit of the fluorescent lamp.

An electrode is disposed at each end of the bulb 131 and hermetically enclosed in the bulb of an arc tube 115. Of the two electrodes, one is referred to as the preheating-side electrode 133a, while the other is referred to as the non-preheating-side electrode 133b. The arc tube 115 including these electrodes 133a, 133b is adapted to cope with a lighting circuit designed to light the lamp by preheating only one of the electrodes, i.e. the preheating-side electrode 133a, by means of a lighting device 151 connected to a power supply E. The lighting device 151 may be an inverter or the like.

The tubular bodies 134a, 134b, 134c of the bulb 131 are respectively provided with cylindrical minute tubes 140a, 140b, 140c, each of which communicates with the corresponding tubular body 134a, 134b, 134c and projects from an end thereof. Of these minute tubes, the minute tubes 140a, 140c of the tubular bodies 134a, 134c, which are respectively located at the two ends of the bulb 131, project from the non-electrode ends, i.e. the ends opposite the ends at which the electrodes 133a, 133b are attached.

If it is necessary, the minute tube that is closest to the preheating-side electrode 133a, i.e. the minute tube 140a, may contain a main amalgam 142a, which serves as the amalgam referred to in the claims and other parts of this specification and has the same configuration as that of the amalgam 142 described above.

The pair of copper-weld wires 145 of each electrode 133a, 133b is provided with an auxiliary amalgam 152a, which is enclosed in the bulb 131 together with the corresponding electrode 133a, 133b. Each auxiliary amalgam 152a consists of a foil of such a metal as stainless steel or a nickel, or a metal having a high melting point, such as molybdenum, tantalum or niobium, and indium bonded to the surface of said metal foil by means of plating or vapor deposition.

An auxiliary amalgam 152b is disposed at an end of the tubular body 134 that is located at the middle portion of the bulb 131. The end where the auxiliary amalgam 152b is disposed is located opposite the minute tube 140b and at a long distance from the main amalgam 142a. The auxiliary amalgam 152b has mercury vapor pressure characteristics similar to those of the auxiliary amalgams 152a; it absorbs mercury vapor when the lamp is turned off and releases mercury vapor when the lamp is turned on.

With the configuration as above, by enclosing the main amalgam 142a in the minute tube 140a, which is the closest minute tube to the preheating-side electrode 133a and is located at the non-electrode end of the tubular body 134a at one end of the bulb 131, the embodiment makes the main amalgam 142 easy to be warmed by the heat from the preheating-side electrode 133a at the initiation of lighting and improves the rising characteristics of luminous flux.

By means of the auxiliary amalgams 152a disposed at the electrodes 133a, 133b and the auxiliary amalgam 152b disposed halfway between the electrodes 133a, 133b, the embodiment is capable of releasing the mercury at the initial stage of lighting, thereby improving the rising characteristics of luminous flux.

As the auxiliary amalgam 152b having mercury vapor pressure characteristics similar to those of the main amalgam 142a and the auxiliary amalgams 152a is enclosed in the bulb 131, the auxiliary amalgam 152b works in conjunction with the main amalgam 142a and the auxiliary amalgams 152a to maintain the pressure of the mercury vapor in the bulb 131 within an appropriate range and reduce the time taken for the luminous flux to become stable when lighting is initiated.

Figure 20:
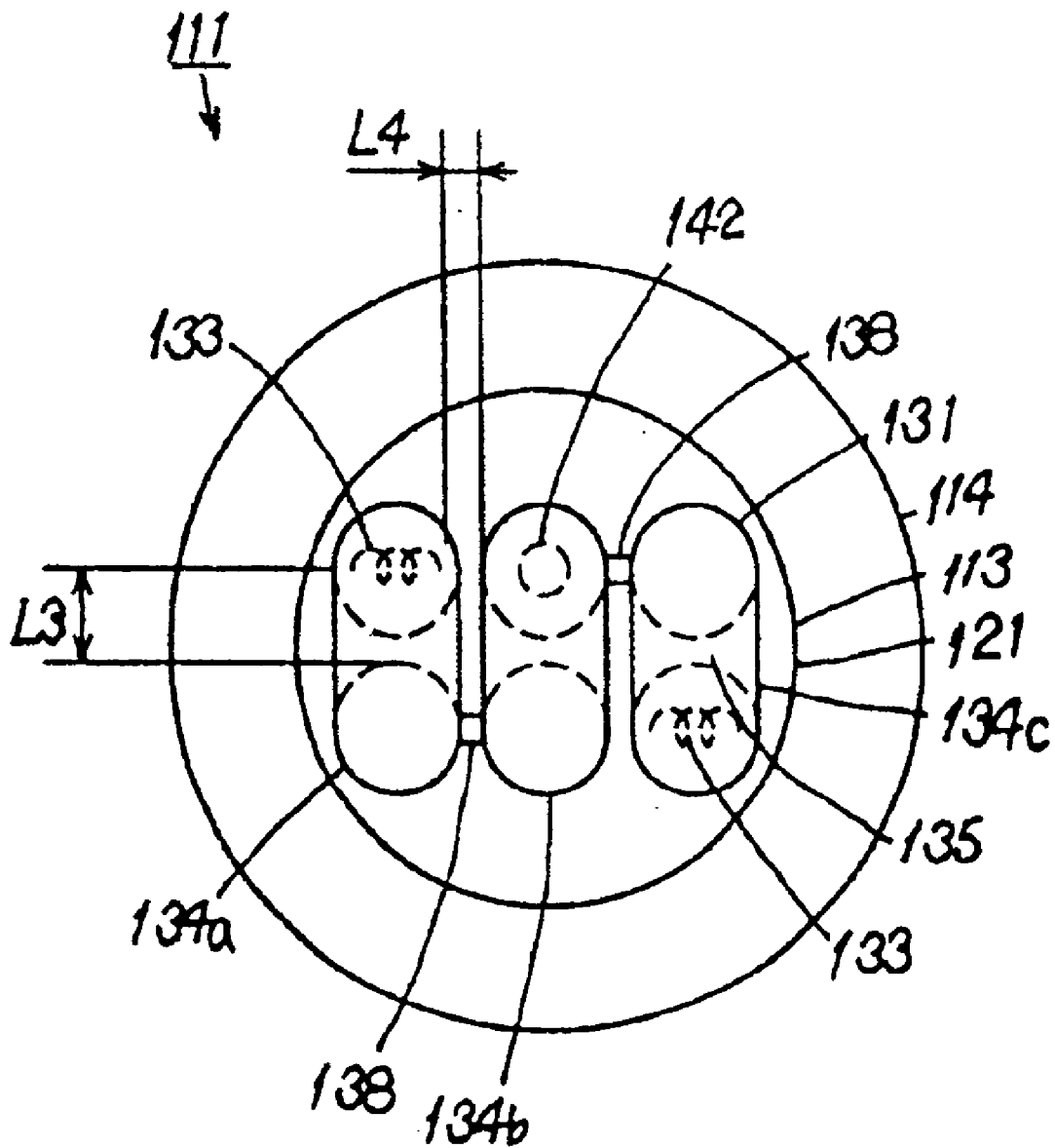
FIG. 20 is a top view of a fluorescent lamp according to a 12th embodiment of the present invention, wherein the globe of said fluorescent lamp is illustrated as if the inside contents were visible.

Next, the 12th embodiment of the invention is shown in FIG. 20, which is a top view of a fluorescent lamp, with the globe of said fluorescent lamp illustrated as if the inside contents were visible.

A bulb 131 having a curved discharge path 139 is formed by connecting a plurality of U-shaped tubular bodies 134a, 134b, 134c in such a manner that the planes defined by these tubular bodies 134a, 134b, 134c face one another and extend in parallel.

As the distance L3 between the electrode 133 of each tubular body 134a, 134c and the other end of the tubular body 134a, 134c, i.e. the end at which the electrode is not provided, is greater than the distance L4 between the electrode 133 and the corresponding end of the tubular body 134b adjacent to the electrode 133, disposing an amalgam 142 (or a main amalgam 142a) in the crown of the tubular body 134b adjacent to the electrode 133 is more effective to improve vaporization of the mercury.

In any one of the embodiments described above, the bulb may be formed by connecting four, five or more tubular bodies.

INDUSTRIAL APPLICABILITY

As described above, a fluorescent lamp, a self-ballasted fluorescent lamp and a luminaire according to the present invention are suitable for a compact structure, in particular, a structure which uses a fluorescent lamp in place of a typical light bulb.

What is claimed is:

1. A self-ballasted fluoresecent lamp comprising:

an arc tube formed by parallely arranging a plurality of U-shaped bent bulbs having an outer tube diameter ranging from about 8 mm to about 11 mm in such a manner that the maximum width of the bulbs ranges from about 32 mm to about 42 mm, each of which has a bent portion and straight portions;

a cover including a base that is adapted to permit said arc tube to be attached thereto;

a lighting circuit which includes a circuit board having the maximum width ranging up to 1.2 times the maximum width of the arc tube, said maximum width of the arc tube being the dimension along which the U-shaped bent bulbs are arranged, and said lighting circuit contained in the cover in such a manner that the circuit board is positioned with one of its sides facing all the ends of the straight portions of the arc tube and provided with components having relatively high heat resistance mounted on the side of the circuit board facing the arc rube and components having relative low heat resistance mounted on the opposite side of the circuit board.

2. A self-ballasted fluorescent lamp as claimed in claim 1, wherein said components having relatively high heat resistance the fluorescent lamp are chip-shaped rectifying devices.

3. A self-ballasted fluorescent lamp, as in claim 1, wherein:

the U-shaped bent bulbs of the arc tube are arranged in such a manner that the cross sections of the U-shaped bent bulbs give the appearance of a triangle;

a distance w1 between the two straight portions of each U-shaped bent bulb is so set as to be nearly identical to a distance w2 between each straight portion of each U-shaped bent bulb that is adjacent to said straight portion;

said distances w1, w2 are respectively limited in the range from about 1 mm to about 5 mm;

said lighting circuit includes a half-bride type inverter main circuit having at least a pair of transistors consisting of an N—channel transistor and a P-channel transistor, which are connected in series with each other to an input power supply and serve as the main switching element for generating a high frequency voltage;

said lighting circuit further including a ballast choke connected to the main inverter main circuit so as to light the arc tube in stable conditions; and said lighting circuit further including a control means which has a secondary winding magnetically connected to the ballast choke and shared by the N—channel transistor and the P-channel transistor so that the control means serves to control the transistors by means of the secondary winding.

4. A luminaire including a self-ballasted fluorescent lamp as claimed in claim 1.

\* \* \* \* \*

UNITED STATES PATENT AND TRADEMARK OFFICE
CERTIFICATE OF CORRECTION

PATENT NO. : 6,781,315 B2
DATED : August 24, 2004
INVENTOR(S) : Kiyoshi Nishio et al.

It is certified that error appears in the above-identified patent and that said Letters Patent is hereby corrected as shown below:

Title page,
Item [30], Related U.S. Application Data, please delete "Division of application No. 09/242,227, filed on Feb. 11, 1999, which is a division of application No. PCT/JP98/02556, filed on Jun. 11, 1998." and substitute -- Division of application No. 09/242,227, filed on Feb. 11, 1999, which is a § 371 National Stage application of PCT/JP98/02556, filed on Jun. 10, 1998 --.

Signed and Sealed this

Twenty-first Day of December, 2004

JON W. DUDAS
*Director of the United States Patent and Trademark Office*